(12) United States Patent
Nakahira et al.

(10) Patent No.: US 8,730,318 B2
(45) Date of Patent: May 20, 2014

(54) INSPECTION APPARATUS AND METHOD FOR PRODUCING IMAGE FOR INSPECTION

(75) Inventors: Kenji Nakahira, Fujisawa (JP); Atsushi Miyamoto, Yokohama (JP); Naoki Hosoya, Tokyo (JP); Minoru Yoshida, Takahagi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 209 days.

(21) Appl. No.: 13/160,108

(22) Filed: Jun. 14, 2011

(65) Prior Publication Data

US 2012/0026317 A1 Feb. 2, 2012

(30) Foreign Application Priority Data

Jul. 29, 2010 (JP) ................................. 2010-170561
Jan. 28, 2011 (JP) ................................. 2011-016614

(51) Int. Cl.
*H04N 9/47* (2006.01)
*H04N 5/235* (2006.01)
*G06K 9/00* (2006.01)

(52) U.S. Cl.
USPC ........................ 348/92; 348/229.1; 382/145

(58) Field of Classification Search
USPC ................... 348/92, E07.085, 229.1, 222.1, 348/E05.034; 356/302; 382/152, 255, 141, 382/128, 129
See application file for complete search history.

(56) References Cited

U.S. PATENT DOCUMENTS

2006/0226337 A1* 10/2006 Lim et al. .................. 250/208.1
2007/0047835 A1* 3/2007 Kondo ........................ 382/275
2009/0274389 A1 11/2009 Yamamoto
2010/0026823 A1 2/2010 Sawada
2010/0129059 A1 5/2010 Aikawa et al.
2010/0309308 A1* 12/2010 Saphier et al. ................... 348/92

FOREIGN PATENT DOCUMENTS

| JP | 9-311193 A | 12/1997 |
| JP | 10-221481 A | 8/1998 |
| JP | 2007-274213 A | 10/2007 |
| JP | 2007-324770 A | 12/2007 |
| JP | 2008-190872 A | 8/2008 |
| JP | 2008-278143 A | 11/2008 |
| JP | 2009-65350 A | 3/2009 |
| JP | 2009-194700 A | 8/2009 |
| JP | 2009-271096 A | 11/2009 |

OTHER PUBLICATIONS

Transient Noise Characterization and Filtration in CCD Cameras Exposed to Stray Radiation From a Medical Linear Accalerator; Louis Archambault, Tina Marie Briere and Sam Beddar, by Medical Physics, Oct. 2008; 35(10):4342-4351/PMC2736755.*
Japanese Office Action dated Oct. 29, 2013 (3 pages).

* cited by examiner

*Primary Examiner* — Dave Czekaj
*Assistant Examiner* — Dramos I Kalapodas
(74) *Attorney, Agent, or Firm* — Crowell & Moring LLP

(57) ABSTRACT

In order to obtain a quality image without deterioration owing to radiation noise in inspection using the optical video camera in high radiation environment, an inspection apparatus is formed of an image pick-up unit, an image obtaining unit which fetches a video image that contains a signal (noise) that is substantially independent of each frame obtained by the image pick-up unit, a local alignment unit which locally aligns frames with different time phases for forming the image fetched by the image obtaining unit, a frame synthesizing unit which synthesizes the plurality of frames aligned by the local alignment unit for generating a synthesis frame with an SN ratio higher than the SN ratio of the frame before frame synthesis, and an image output unit for displaying or recording the image formed of the synthesis frame generated by the frame synthesizing unit.

8 Claims, 24 Drawing Sheets

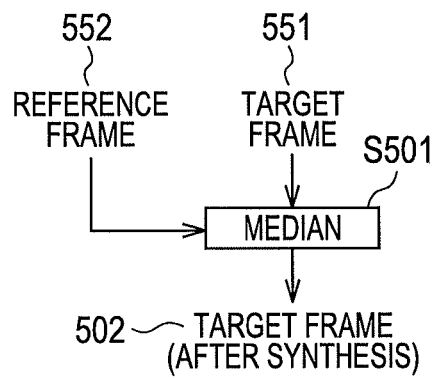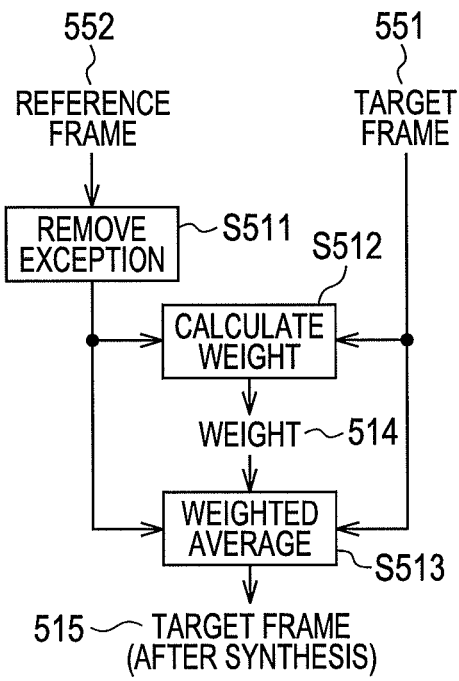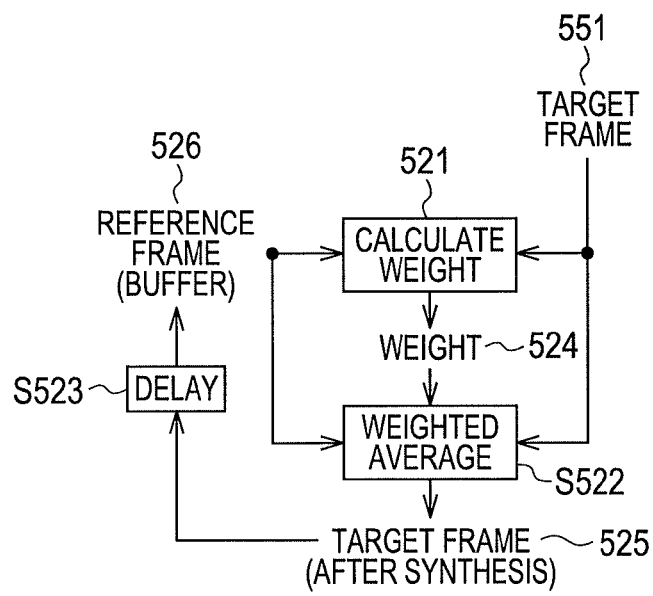

FIG. 6A
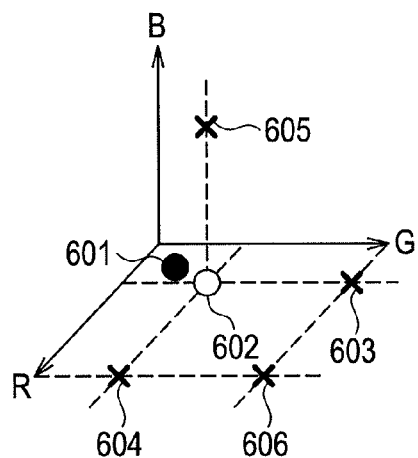
FIG. 6B
| | FRAME SYNTHESIS WEIGHT 611 | | |
|---|---|---|---|
| | R | G | B |
| POINT 603 | LARGE | SMALL | LARGE |
| POINT 604 | SMALL | LARGE | LARGE |
| POINT 606 | SMALL | SMALL | LARGE |
FIG. 7A
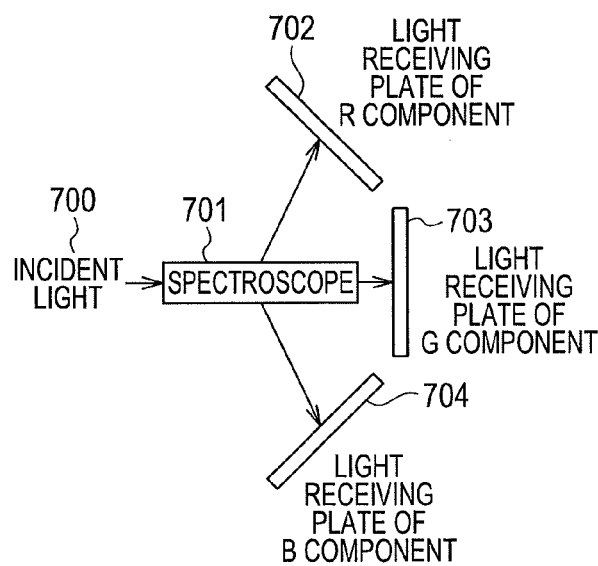
FIG. 7B
| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |
710 ...

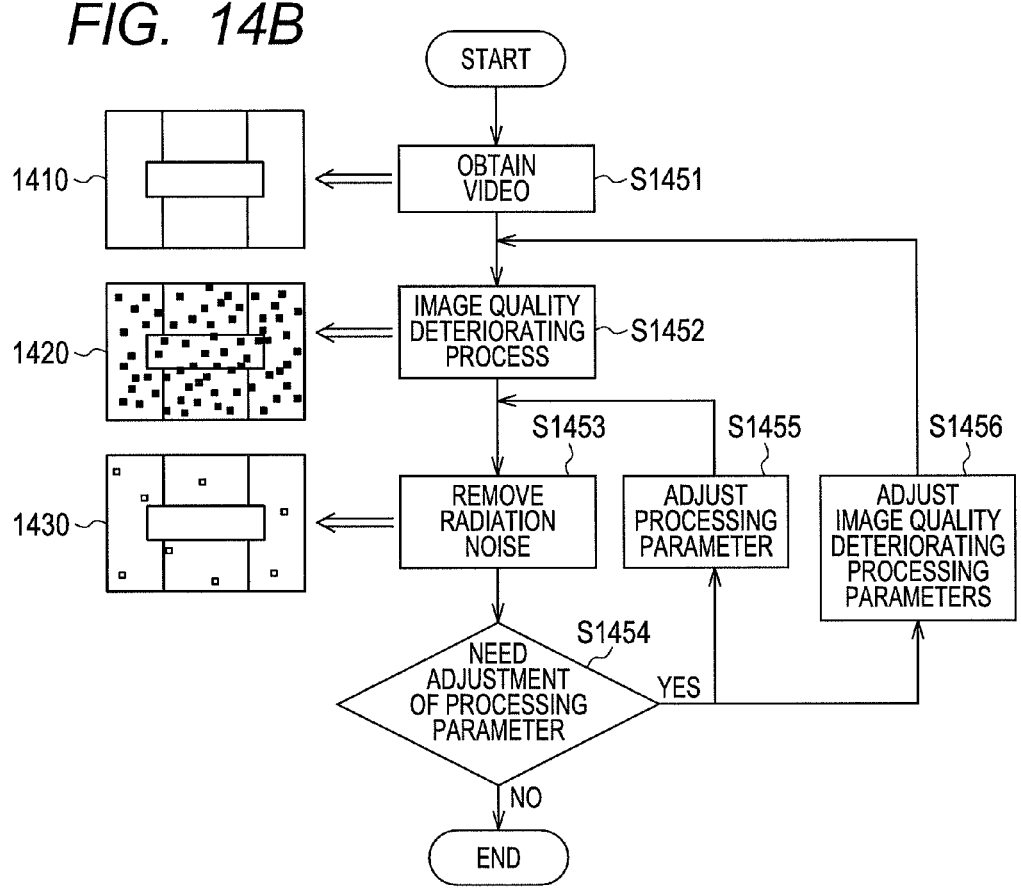
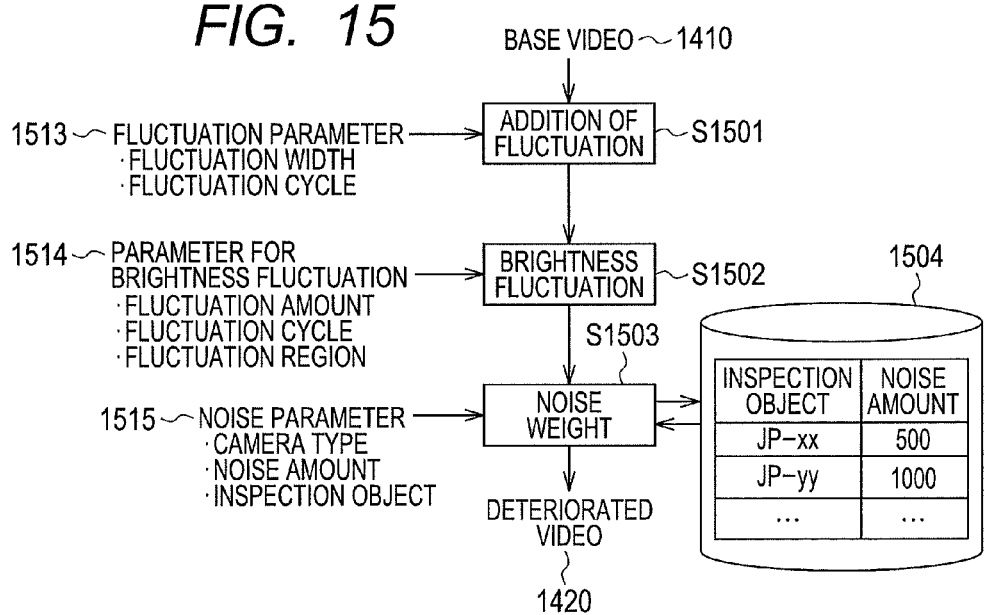

INSPECTION APPARATUS AND METHOD FOR PRODUCING IMAGE FOR INSPECTION

BACKGROUND

The present invention relates to an inspection apparatus for inspection using an image picked up by an optical camera, and a method for producing the image for inspection.

The system for handling radiation, for example, power plant has been demanded to ensure high safety, and required to execute sufficient inspection on a regular basis. Structures of the nuclear power reactor, for example, the reactor pressure vessel, the shroud in the vessel, the core support plate and the like are inspected as inspection objects. The inspection for objects other than those of the nuclear power reactor, for example, fuel assembly has been conducted.

The inspection method conducted by visually checking the surface condition of the inspection object using the optical camera has been employed as one of the inspection methods. In the visual checking, the camera is brought to close to the object, and the picked up image is shown on the display provided in a location with less radiation apart from the object so that the inspector performs the visual checking. The picked-up images are recorded so as to be confirmed later. The camera is provided with a remote-control operation function using a drive unit for mobility in the image pick-up area, or structured to allow the inspector to manually operate the camera from the place apart from the image pick-up area. Color or gray scale video information is obtained from the camera.

The inspection is conducted in the environment with high radiation intensity, for example, gamma ray, and noise is likely to be superimposed on the image picked up by the camera under the radiation influence, thus deteriorating visibility. This may cause the problem which hinders establishment of high reliability for inspecting soundness of the object. For this, the structure provided with radiation shield has been disclosed in Japanese Unexamined Patent Publication No. 9-311193 for reducing the influence of radiation on the camera.

The radiation may damage electronic circuit in the camera, and its functions as well. Especially, the recent miniaturized semiconductors tend to be susceptible to the damage. Once it is damaged, the camera element with high resolution, the one with wide dynamic range, and integrated circuit required for transmitting a large amount of image signals at high speeds hardly work. If durability against radiation is prioritized, the camera which employs few electronic circuits needs to be used as the one with low resolution and narrow dynamic range.

Meanwhile, Japanese Unexamined Patent Publication No. 10-221481 discloses the compact inspection device, and inspection device capable of traveling underwater aiming at the inspection in the narrow portion and easy operation.

The method is considered as applicable for reducing radiation noise by subjecting the obtained image to the image processing. Use of smoothing filter and median filter has been known as a general denoising method.

During the normal inspection, the lighting device is brought to be close to the object together with the camera for illumination. If the inspection object has a three-dimensionally complicated structure, the region which allows placement of the camera or the range which allows the illumination to reach are limited, making the illumination partially insufficient or excessive.

So another problem arises that it is difficult to pick up the video image by the camera for inspection under the appropriate illumination.

Japanese Unexamined Patent Publication NO. 2009-271096 discloses the method for executing contrast correction by obtaining correction formula based on brightness in the dark field and the brightness in bright field of the digital camera so as to improve visibility in reference to brightness of the image.

Japanese Unexamined Patent Publication No. 2009-65350 discloses the method for synthesizing a plurality of images each picked up by varying the exposure condition into the image in the digital camera field.

It is difficult for the method as proposed in Japanese Unexamined Patent Publication No. 9-311193 to reduce size and weight of the inspection device because of its radiation shield. In order to reduce the gamma-ray dose to 10%, the thickness of the apparatus needs to be 4 cm or larger while using lead which has been widely used as the gamma-ray shielding material.

Meanwhile, provision of the radiation shield for the device as disclosed in Japanese Unexamined Patent Publication No. 10-221481 is not practical from the aspect of size and weight.

General denoising process using the smoothing filter and median filter may cause problems as below. It is difficult for the smoothing filter and the median filter to appropriately suppress only the radiation noise while storing the component (signal component) except the radiation noise. The smoothing filter tends to deteriorate the high-frequency component of the signal to provide blurred images. The median filter provides substantially quality images when the noise amount is low, but may have its performance deteriorated when the noise amount is increased. When using the space filter with high accuracy such as load median filter besides those described above, improvement of the SN ratio (ratio of amount of signal component to radiation noise amount) is limited.

There is no image processing method for completely removing only noise in any images, and accordingly, deterioration in the signal component and residual noise are unavoidable to a certain degree. As to what degree deterioration in the signal component or the residual noise is allowed may vary depending on the inspection object and inspection type. There exists no interface which allows easy designation of the desired image in reducing the noise through the image processing.

During the actual inspection, there may be often the case that the inspection in wide range is conducted while moving the camera. In such a case, a plurality of positions with different radiation doses have to be inspected, and accordingly, the radiation noise amount contained in the image may vary as the camera moves. Under the environment with a small noise amount, denoising may be conducted relatively easily. However, under the environment with a large noise amount, it is difficult to conduct denoising. Therefore, it is difficult to provide quality image regardless of noise amount.

The method disclosed in Japanese Unexamined Patent Publication No. 2009-271096 applies the same contrast correction over the entire image, which fails to greatly improve visibility of interest region locally.

The method disclosed in Japanese Unexamined Patent Publication No. 2009-65350 requires a plurality of images with varied exposure conditions. However, if the inspection object has a three-dimensionally complicated structure to ensure reliability of inspection, it is difficult to arbitrarily change the exposure condition.

Under the radiation environment, the structure with radiation shield may be considered for reducing the influence of radiation on the camera. Such structure allows the use of high-performance camera which is hardly damaged by the radiation. In this case, it is difficult to reduce size and weight of the inspection apparatus because of the radiation shield. For example, in order to reduce the gamma-ray dose to 10%, the thickness of the structure needs to be 4 cm or larger while using lead which has been widely used as the gamma-ray shielding material. Therefore, it is not practical for conducting the inspection in narrow portion in terms of size and weight.

In the case where inspection is conducted using the image of the inspection object, which has been picked up by the camera, the method for creating the image with resolution higher than the pixel resolution of the camera may be considered. This method is capable of intensifying the resolution, but fails to improve the contrast of the image having the contrast partially lowered owing to insufficient or excessive illumination. The method is not regarded as the solution for the deteriorated visibility from the aforementioned aspect.

SUMMARY

The present invention provides an inspection method which allows use of the image (same image) with good visibility for inspection, and method for creating the inspection image. The present invention further provides the inspection method which allows improvement of local visibility, and method for creating the inspection image.

The present invention further provides an inspection apparatus for inspecting the image (video image) picked up by the optical camera, and the method for creating the inspection image.

(1) According to the invention, the image (video image) is fetched from the optical camera so that a plurality of frames for forming the image each having different time phase are locally aligned, the locally aligned frames are subjected to the frame synthesis to create the frame with SN ratio higher than the ratio of the frame before synthesis, and the image formed of the synthesized frames is displayed or recorded.

The signal components are correlated among a plurality of frames with continuous time phases, while superimposing the radiation noise on the respective frames substantially independently. The appropriate frame synthesis ensures reduction of the radiation noise while having the signal components stored. Displacement of the signal component occurs among frames owing to movement of the camera. Since the inspection object has the three-dimensional structure, the displacement varies depending on the position on the image. The alignment is locally conducted among frames to allow accurate calculation of the displacement for each local region. As a result, the signal component may be appropriately stored in the frame synthesizing process.

(2) According to the present invention, the component value of the obtained color image corresponding to the light receiving method of the color optical camera is calculated so as to provide the denoising level for each of the respective calculated component values.

For example, it may be considered that the image derived from the color optical camera which is formed of light receiving elements of R (red), G (green), and B (blue) (hereinafter referred to as RGB camera) has the radiation noise superimposed on the R, G, and B components for forming the image substantially independently. The use of the RGB camera ensures calculation of three component values of R, G and B of the derived color information for the respective pixels for synthesizing frames with respect to each of the components. This makes it possible to remove the radiation noise more appropriately compared to the case of frame synthesis for calculating the noise removing level in common to those component values.

(3) According to the present invention, both the image fetched from the optical camera and the image formed of the synthesized frames may be simultaneously displayed or recorded.

If the inspector is allowed to observe not only the image having the radiation noise removed but also the image before removing the radiation noise, more information data may be obtained, resulting in improved usability. For example, the inspector is allowed to visually confirm the radiation noise amount more clearly, and to adjust the processing parameters for removing the radiation noise during the inspection easily while observing both images.

(4) According to the present invention, the image is fetched from the optical camera, a plurality of frames with different time phases for forming the image are locally aligned, the aligned plurality of frames are synthesized to create the frame with an SN ratio higher than the SN ratio of the frame before synthesis, and the image formed of the synthesized frame is displayed or recorded. Furthermore, the radiation noise amount contained in the image fetched from the optical camera is measured, and the processing parameters which relate to the alignment, frame synthesis, or image output are changed in accordance with the measured radiation noise amount.

The method for appropriately removing the radiation noise is different depending on the radiation noise amount. If the noise amount is small, the image with excellent quality may be obtained in spite of the process using only a small amount of frames. On the contrary, if the noise amount is large, it is difficult to suppress noise unless a large number of frames are used. In order to conduct high-performance denoising in the case of large noise amount, it is necessary not only to use a large number of frames, but also conduct complicated process. Use of a large number of frames, and the complicated process may cause disadvantage of prolonged processing time. The number of the frames and other processing parameters may be changed in accordance with the radiation noise amount to constantly provide quality images.

(5) According to the present invention, the radiation noise amount is measured using the frame before frame synthesis and the frame after the frame synthesis.

The radiation noise amount may be measured using the image picked up by the camera. When measuring the noise amount, the radiation noise needs to be extracted with accuracy from the image. Such noise may be extracted with relatively higher accuracy without adding complicated process for measuring the radiation noise amount only by subtracting the frame after the frame synthesis from the frame before the frame synthesis.

(6) According to the present invention, among the processing parameters which relate to alignment, frame synthesis or image output, the image display rate or recording rate is changed.

As the radiation noise amount is increased, more computation is required for removing the radiation noise while storing the signal component. The device with limited computation capability has to sacrifice the denoising performance unless the display rate and recording rate are lowered. For the inspector, it is often the case that the image with less noise may be easily inspected in spite of slightly lowered rate compared to the case where the image with higher noise amount is inspected for displaying or recording at a higher rate. Then the display rate or the recording rate may be changed in accordance with the radiation noise amount for processing while maintaining the higher rate in the case of low noise amount, and while emphasizing the image quality in the case of high noise amount.

(7) According to the present invention, the image is fetched from the optical camera, the image with high SN ratio is created by subjecting the fetched image to the radiation noise removing process, and the created image is displayed or recorded. The calibration function is provided for adjusting the processing parameters which relate to the radiation noise removing process, the image display or image recording using the image for calibration prior to the inspection. With the calibration function, the noise superimposed image obtained through pseudo superimposing of the noise on the image for calibration is subjected to the radiation noise removing process. Interface is further provided to adjust the processing parameters based on the image after the radiation noise removing process.

The calibration function allows adjustment of parameters of radiation noise removing process before inspection for obtaining the image visually recognized by the inspector with ease. Compared with the case where the processing parameters need to be adjusted for each inspection, the aforementioned structure provides advantage of reducing the inspection time. The image which contains no radiation noise may be obtained as the image for calibration so as to compare the image after denoising with the image which contains no radiation noise. This makes it possible to correctly confirm as to what extent the signal component has been deteriorated by the denoising process, or denoising performance upon change in the noise amount.

(8) According to the present invention, the image is fetched from the optical camera, the plurality of frames with different time phases for forming the fetched image are locally aligned, the aligned plurality of frames are subjected to the frame synthesis to create the frame with SN ratio higher than the frame before the frame synthesis, and the created image is displayed or recorded. Furthermore, the calibration function is provided for adjusting the processing parameters which relate to the radiation noise removing process, image display or image recording using the image for calibration before inspection. The calibration function subjects the noise superimposed image obtained through pseudo superimposing of the noise on the image for calibration to the radiation noise removing process. The interface is provided to adjust the processing parameters based on the image after the radiation noise removing process.

As described above, after performing the local alignment as the radiation noise removing process, the frame synthesis is conducted to allow reduction of the radiation noise while appropriately storing the signal components. The calibration function for the process allows appropriate adjustment of the processing parameters which relate to the local alignment and frame synthesis, thus making it possible to provide the desired image quality.

(9) According to the present invention, the calibration function adjusts the processing parameters so that the image obtained by subjecting the noise superimposed image to the radiation noise removing process is brought to be close to the image for calibration before superimposing the noise.

Adjustment of the processing parameters allows the inspector to adjust them only when needed, which makes it possible to provide good processing results while alleviating burden on the inspector for such adjustment.

The present invention provides a method for producing an image for inspection which includes the steps of picking up an inside of an inspection object largely influenced by radiation by a camera to obtain an inner image of the inspection object, receiving the picked up image at a place less influenced by the radiation apart from the inspection object, setting an inner interest region of the inspection object from the received image, correcting a contrast of the image in the set interest region, displaying the image subjected to the contrast correction on a screen, and recording the image having the contrast corrected, which is displayed on the screen in a recording unit.

The present invention provides an inspection apparatus which includes an image pick-up unit which picks up an image (video) of inside an inspection object which is largely influenced by radiation to obtain an inner image of the inspection object, an image processing unit which receives the picked up image obtained by the image pick-up unit at a place less influenced by the radiation apart from the inspection object for processing the received image, an output unit which includes a screen on which the image processed by the image processing unit is displayed, and an image storage unit which stores the image displayed on the screen of the output unit. The image processing unit includes an interest region setting unit for setting an interest region inside the inspection object from the received image, and an image contrast correction unit for correcting a contrast of the image in the interest region set by the interest region setting unit. The output unit displays the image having the contrast corrected by the image contrast correction unit on the screen.

According to the present invention, the plurality of frames with different time phases for forming the image are subjected to the local alignment, and those frames are synthesized so as to create the frame with SN ratio higher than that of the frame before the frame synthesis, thus making it possible to effectively remove the radiation noise.

The present invention provides the apparatus for inspecting the inspection object greatly susceptible to the radiation influence, which may be used for inspecting the image with excellent visibility by conducting contrast correction. The apparatus for inspecting the inspection object greatly susceptible to the radiation influence may have its local visibility largely improved by conducting the correction by setting the interest region.

These features and advantages of the invention will be apparent from the following more particular description of preferred embodiments of the invention, as illustrated in the accompanying drawings.

BRIEF DESCRIPTION OF THE DRAWINGS

FIG. 5A is a flowchart representing step of executing the frame synthesis by obtaining median between the reference frame and the target frame;

FIG. 5B is a flowchart representing step of executing the frame synthesis by processing weight calculation and weighted average after subjecting the reference frame to exception removing process;

FIG. 5C is a flowchart representing step of executing the frame synthesis using the target frame after the frame synthesis as the reference frame for the subsequent weight calculation process;

FIG. 6A illustrates a three-dimensional space as an example of brightness value when the radiation noise is superimposed on the color image;

FIG. 6B is a table showing frame synthesis weights for the respective points 603, 604 and 606;

FIG. 7A is an explanatory view with respect to a light receiving principle of a RGB camera of 3-CCD type;

FIG. 7B is an explanatory view with respect to the light receiving principle of the RGB camera of single integration type;

FIG. 14B is a flowchart representing the process for manually adjusting the processing parameter for denoising according to Example 2 of the present invention;

FIG. 15 represents the flow of the process for creating a deteriorated image from a base image according to Example 2 of the present invention;

DESCRIPTION OF THE PREFERRED EMBODIMENTS

The present invention relates to an inspection apparatus for inspection using an image obtained by an optical video camera. More particularly, the invention provides a denoising method for executing denoising process by subjecting a video image on which a substantially independent signal (noise) of each frame of the picked up video image is superimposed to the image processing, and a denoising apparatus. The following explanations describe an exemplary case where radiation noise is considered as the signal (noise) substantially independent of each frame of the picked up video image according to embodiments of the present invention.

Example 1

Figure 1:
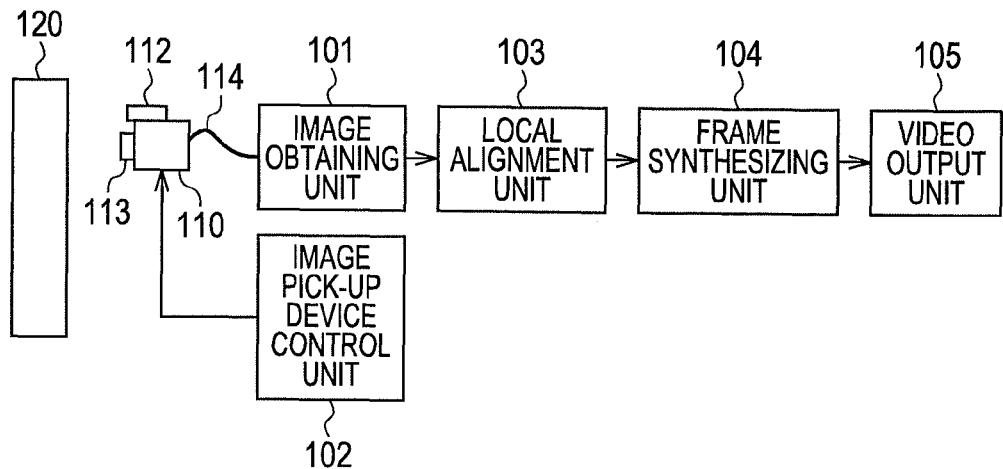
FIG. 1 is a block diagram illustrating a basic structure of a visual inspection apparatus according to Example 1 of the present invention.

FIG. 1 illustrates a basic structure of an inspection apparatus (for visual inspection) according to Example 1. The inspection apparatus includes an image pick-up device 110, an image obtaining unit 101, an image (pick-up) device control unit 102, a local alignment unit 103, a frame synthesizing unit 104, and an image output unit 105. The image pick-up device 110 is provided with an optical video camera 113. Only the image pick-up device 110 is brought to be close to an inspection object 120 for inspection, and the remaining units 101 to 105 except the image pick-up device 110 are placed outside the environment with high radiation dose. The image pick-up device 110 may be provided with a lighting unit 112 and a device drive unit (not shown).

An image (video) of the inspection object 120 picked up by the optical video camera 113 is obtained by the image obtaining unit 101. The optical video camera 113 is capable of picking a color video image or a gray scale video image. An image pick-up tube, CCD, and CMOS may be employed as the optical video camera 113. The video image from the image pick-up device 110 is transferred to the image obtaining unit 101 via a cable 114. Wireless communication is available between the image pick-up device 110 and the image obtaining unit 101. After alignment of a plurality of frames of the video image by the local alignment unit 103, the aligned frames are synthesized by the frame synthesizing unit 104. The image formed of the synthesized frames is displayed or recorded by the image output unit 105.

Figure 2:
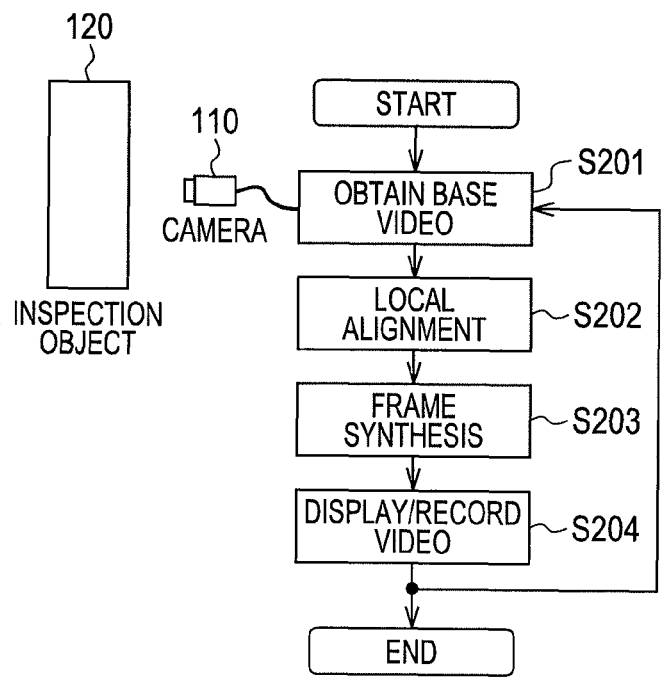
FIG. 2 is a flowchart that represents the process for denoising by executing image processing of the image having the radiation noise superimposed according to Example 1 of the present invention.

Procedure for inspection using the apparatus shown in FIG. 1 will be described referring to FIG. 2. FIG. 2 represents the sequence for executing denoising process by subjecting the image of the inspection object 120, which is formed of a plurality of frames having radiation noise superimposed while moving the image pick-up device 110 using the apparatus shown in FIG. 1. In step S201, an image of the inspection object 120 is picked up by the image pick-up device 110. In step S202, the plurality of frames with different time phases, which form the image, are locally aligned. Then the aligned plurality of frames are synthesized in frame synthesizing step S203 so as to obtain the frame with an SN ratio higher than that of the frame before synthesis. The SN ratio denotes a ratio between signal component amount and radiation noise amount. Each of the frames for forming the obtained image is subjected to the process in steps S202 and S203 repeatedly. Finally in step S204, the image (video) formed of the frames derived from the frame synthesizing step S203 is displayed or recorded.

The signal components are correlated among the plurality of consecutive frames, while having radiation noise superimposed on each frame substantially in independent manner. Appropriate execution of frame synthesis may reduce the radiation noise while keeping the signal components. Movement of the camera may also cause displacement of the signal components among the frames. As the inspection object has a three-dimensional structure, the displacement amount may differ depending on the position on the image. Alignment is locally performed among the frames so as to allow accurate calculation of the displacement amount per local region, and as a result, the signal components may be appropriately maintained by executing the frame synthesizing process.

Figure 3A:
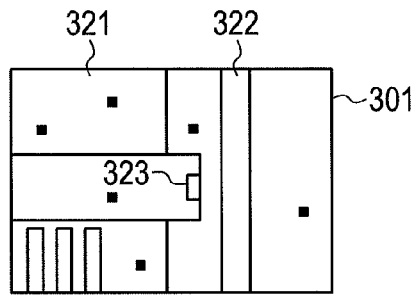
FIG. 3A represents a frame image subjected to the radiation noise removing process.
Figure 3B:
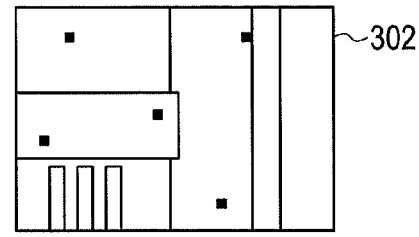
FIG. 3B represents a reference frame image for executing the frame synthesis.

FIGS. 3A to 3F represent an exemplary method for splitting the image into local regions in local alignment step S202. Referring to FIG. 3A, a frame 301 is subjected to the radiation noise removing process. Referring to FIG. 3B, a frame 302 is referred when subjecting the objet frame 301 to the frame synthesizing process (hereinafter referred to as a reference frame). A plurality of reference frames corresponding to the single target frame may be employed. The reference frame which is close to the target frame in terms of the time is employed. Local displacement exists between the target frame and the reference frame under the influence of movement of the camera. However, in most of the cases, the image may be regarded as being displayed on substantially the same point. Meanwhile, the radiation noise is superimposed on each frame substantially independently. So the appropriate frame synthesizing process is executed after alignment between the target frame and the reference frame so as to improve the SN ratio of the target frame.

Figure 3C:
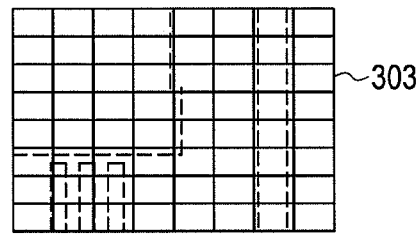
FIG. 3C represents a frame image having the reference frame split into local regions.
Figure 3D:
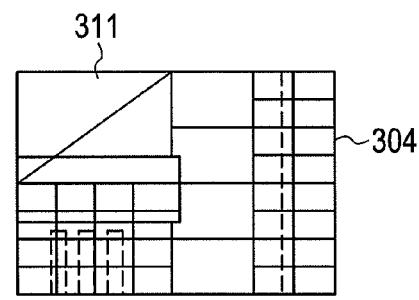
FIG. 3D represents a frame image having the reference frame split into different shaped local regions.
Figure 3E:
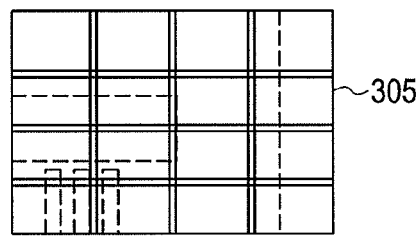
FIG. 3E represents a frame image where the local regions of the reference frame are overlapped.
Figure 3F:
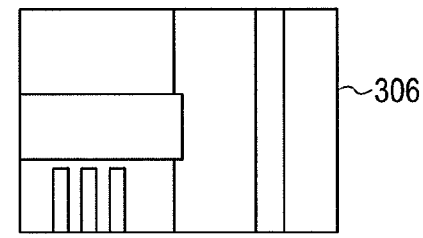
FIG. 3F represents a frame image obtained by performing the region splitting through segmentation so that the local region with similar characteristics of the image signal on the frame are expressed in the same local region.

Referring to FIG. 3C, reference numeral 303 designates an example of the result of splitting the reference frame 302 shown in FIG. 3B to the local regions. In this case, the frame is split to the local regions each having identical shape (as for the example 303, the rectangular shape). In the respective local regions after splitting, alignment is executed by calculating the displacement amount with respect to the target frame. Reference numerals 304 in FIG. 3D to 306 in FIG. 3F denote examples of results of splitting the frame into local regions besides the example 303. In the case of the reference numeral 304 shown in FIG. 3D, the frame is split into local regions with various shapes. Each of split local regions does not have to be rectangular, but may be triangular as indicated by 311 or further complicated shape. Alternatively, likewise 305 shown in FIG. 3E, different local regions may be overlapped with each other. The reference numeral 306 shown in FIG. 3F represents the result of splitting the frame into local regions through segmentation so that the regions with similar signal components on the frame are expressed in the same local region. Likewise 304 shown in FIGS. 3D and 306 shown in FIG. 3F, shape and size of the local region may be dynamically changed in accordance with the information on the frame. Each pixel may be set as the single local region as a result of very fine region splitting.

As the inspection object has a three-dimensional structure, the distance from the structures 321 to 322 appears different between the target frame 301 shown in FIG. 3A and the reference frame 302 shown in FIG. 3B, or the shape appears different as indicated by the structure 323. However, appropriate correlation between the target frame and the reference frame may be conducted by the local alignment with respect to many signal components.

Figure 4A:
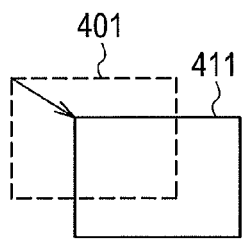
FIG. 4A represents the method for aligning the local regions by parallel movement.
Figure 4B:
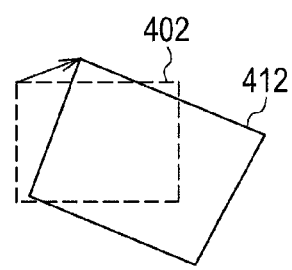
FIG. 4B represents an example for aligning the local regions by performing parallel movement and enlargement or contraction, and rotation and distortion.

FIGS. 4A and 4B show an exemplary method executed in local alignment step S202 for aligning the respective local regions resulting from splitting as indicated by FIGS. 3C to 3F. Each of reference numerals 401 and 402 shows one of the local regions of the reference frame. FIG. 4A represents alignment through parallel movement. In this example, alignment is conducted through parallel movement of the region 401 to the region 411. This alignment is effective when parallel movement is the main cause of displacement between the target frame and the reference frame. FIG. 4B represents an example of alignment through combination of parallel movement, enlargement, contraction, rotation, and distortion. The reference numeral 412 denotes the region as a result of alignment of the region 402. This alignment is effective when displacement between the target frame and the reference frame is caused not only by the parallel movement but also by enlargement and rotation, and distortion of the region.

Movement of the image pick-up device 110 may cause parallel movement, enlargement/contraction and rotation. There may be the case that the image appears distorted. In those cases, alignment as examples of 401 shown in FIG. 4A and 402 shown in FIG. 4B may accurately execute correlation between the target frame and the reference frame. For example, if the influence of the enlargement/contraction which may occur on the image is relatively small, enlargement/contraction is not required for the alignment. In alignment, such process for naturally connecting the local regions without generating gaps thereamong may be executed by interpolating between adjacent local regions.

Step S203 for frame synthesis will be described in detail referring to FIGS. 5A to 5C. In an example shown in FIG. 5A, median is calculated between the frames with respect to pixels corresponding to the target frame 551 and the aligned reference frame 552 (S501), and the calculated result is set to the target frame 502 after synthesis. The radiation noise exhibits characteristics largely different from those of additive white Gaussian noise which has been widely used as the general noise model. When the radiation noise is superimposed on the pixel, its brightness value is largely changed. This problem is managed by calculating the median using one target frame and (n−1) reference frames, that is, n frames in total in step S501, and the brightness value with superimposed noise is removed if the number of the frames which have radiation noise superimposed pixels is less than n/2. This makes it possible to provide the target frame 502 with SN ratio higher than that of the frame before synthesis.

In an example shown in FIG. 5B, the reference frame 552 is subjected to the exception removing process (S511) for removing the reference frame which makes the correlation of the frames difficult under the influence of large movement of the camera. Then weight calculation is executed (S512) to calculate the weight 514 with respect to the target frame 551 and the reference frame 552. Thereafter, weighted average is obtained using the calculated weight 514 (S513) for providing the target frame 515 after synthesis. The weight 514 may be obtained for the respective frames per pixel. If the movement distance of the camera 110 is large to interfere with correct alignment, or radiation noise amount is high, use of the sequence shown in FIG. 5A may fail to execute the improved processing. Use of the frame which interferes with correct alignment may significantly damage image quality.

Execution of the exception removing process in S511 makes it possible to prevent deterioration in the image quality when failing to correct alignment. There may be the case where rough alignment is possible but correct alignment cannot be executed locally. In such a case, the pixel (or local region) which can be regarded as having failed to execute correct alignment is provided with smaller weight so as to provide excellent image quality. The weight for the pixel with high possibility to have the radiation noise superimposed may be reduced. Determination whether or not the possibility having the radiation noise superimposed may be made by comparing the reference frames, comparing the reference frame with the target frame, and comparing brightness values between the adjacent pixels.

In an example shown in FIG. 5C, the target frame 525 after synthesis is used as the reference frame 526 for the subsequent weight calculation process (S521). In the sequence, the synthesized target frame 525 is recorded in the memory by the amount corresponding to a single time phase in delay step (S523), and the recorded frame is used as the reference frame 526 relative to the target frame 551 obtained in the next time phase. A plurality of the reference frames 526 may be employed. Likewise the example shown in FIG. 5B, the weight 524 is obtained with respect to the target frame 551 and the reference frame 526 in weight calculation step (S521). The weighted average is obtained (S522) using the weight 524 so as to obtain the target frame 525 after synthesis. With the aforementioned sequence, use of smaller amount of the reference frames realizes the noise removing level which is the same as being derived from the process indicated by FIGS. 5A and 5B. Accordingly, this makes it possible to reduce the calculation amount and memory usage.

FIG. 6A illustrates an example of brightness value obtained when the radiation noise is superimposed on the color image. The RGB camera formed of light receiving elements of R (red), G (green), and B (blue), and CMY camera formed of light receiving elements of C (cyan), M (magenta), and Y (yellow) may be used as the optical camera. In this example, image pick-up operation executed by the RGB camera will be described as the light receiving type using the light receiving elements of RGB. Information of the brightness value for each pixel is output from the camera. The output mode is different depending on the camera. For example, a group of three scalar values of R, G, B or C, M, Y may be output, or it may be output through the NTSC or PAL method.

Three components of R, G and B are derived from the signal output from the camera so that the brightness value of each pixel is expressed as a point on three-dimensional space in the form of RGB axes as the group of scalar values corresponding to the respective components of R, G and B as shown in FIG. 6A. A point 602 denotes the brightness value (true value) of the specific pixel of a certain frame when the radiation noise is not superimposed.

If the radiation noise is superimposed on the light-receiving element of R, the value corresponding to the R component deviates from the true value as a point 604 shows. Likewise, if the radiation noise is superimposed on the light receiving element of G or B, the value corresponding to the point 603 or 605 will be obtained.

The radiation noise may be superimposed on the light receiving elements of R and G, simultaneously. In this case, values corresponding to the R and G components deviate from the respective true values as indicated by a point 606. Meanwhile, execution of the frame synthesis as described referring to FIGS. 5A to 5C allows estimation of the value close to the true value of the point 602 as indicated by the point 601. In the case of the RGB camera, R, G and B components are those corresponding to the respective light receiving type. In the case of the CMY camera, C, M and Y components are those corresponding to the respective light receiving type.

In frame synthesis through the weighted average as described referring to FIG. 5B, use of different weight values calculated for each component may result in better performance rather than the use of the same weight values for the R, B and G components. More specifically, in the case of the value corresponding to the point 604, the radiation noise is not superimposed on both G and B components, and accordingly, the weight values for them may be increased. On the contrary, as the radiation noise is superimposed on the R component, the weight value for the component may be decreased so as to execute appropriate frame synthesis.

Table 611 shown in FIG. 6B represent each magnitude of the appropriate weight values for the points 603, 604 and 606. The brightness value derived from the RGB camera may be expressed by a single point on the three-dimensional space not only as RGB axes but also as CMY axes. However, execution of the frame synthesis for the values of the CMY components does not provide the aforementioned advantage, thus requiring frame synthesis for the values of RGB components.

Meanwhile, when using the CMY camera instead of the RGB camera, values corresponding to the CMY components in place of the RGB components are subjected to the frame synthesizing process to obtain the similar effect. The values of components corresponding to the light receiving type of the color optical camera are calculated, and the frame synthesis is executed to calculate the noise removing level for the respective components values individually. This makes it possible to remove the radiation noise further appropriately.

FIGS. 7A and 7B represent an exemplary light receiving principle of the RGB camera. As the main structure of the light-receiving unit for the RGB camera, 3-CCD type having three light-receiving plates corresponding to the RGB components as shown in FIG. 7A, and single plate type formed of one light-receiving plate as shown in FIG. 7B are applicable. In the case of the camera of 3-CCD type shown in FIG. 7A, incident light 700 is subjected to spectroscopic process by a spectroscope 701 to components of R, G and B, respectively. Each light for the respective components is received by the light receiving plates for R, G and B components respectively.

Referring to the single plate type as shown in FIG. 7B, the light receiving elements of RGB components are two dimensionally arranged to form a single plate as shown by 710. As human eyes have high sensitivity to the portion around green, a large number of G component elements tend to be arranged. In this way, the respective light-receiving elements of the RGB camera are structured to receive the light of any one of the RGB components. When the light-receiving element reacts with the radiation to have the noise superimposed, noise is superimposed almost independently with respect to the RGB components in spite of the same pixel on the image. The camera other than the RGB camera also has noise substantially independently superimposed for each corresponding component.

Figure 8A:
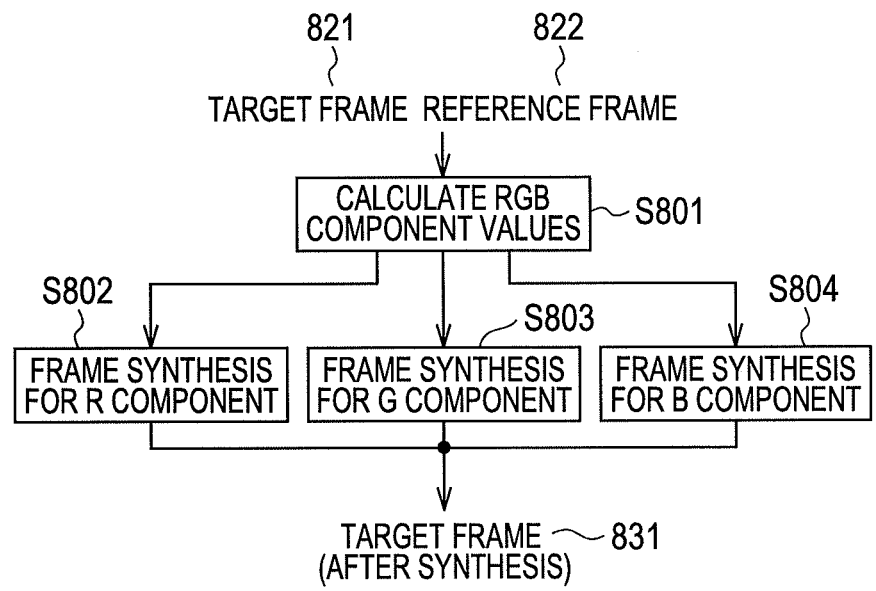
FIG. 8A is a flowchart representing a process for synthesizing frames each subjected to the synthesis for output components of the RGB camera.
Figure 8B:
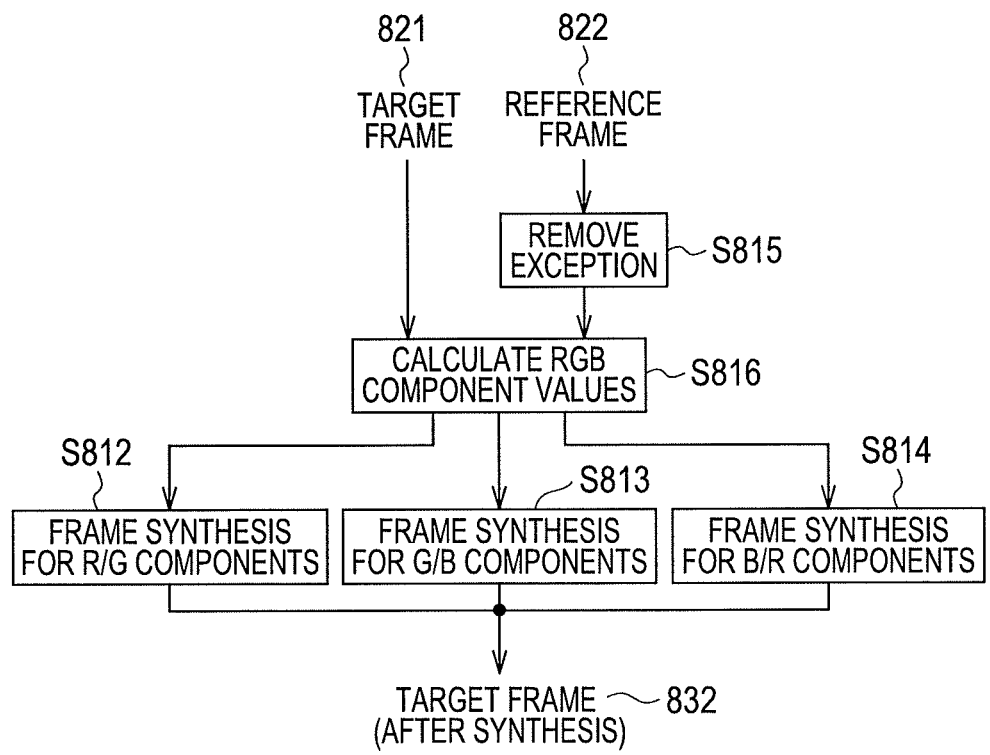
FIG. 8B is a flowchart representing a process in which the frame synthesis for two components is conducted, which will be further synthesized to create the synthesized frame.

FIGS. 8A and 8B represent a sequence for executing the frame synthesizing process S203 where the component value corresponding to the light-receiving type of the color optical camera is calculated, and each denoising level of the respective component values is further calculated. In the example, the RGB camera is used. In the sequence as shown in FIG. 8A, values of the RGB components are calculated with respect to the target frame 821 and the reference frame 822 in step S801. Basically, execution of the process in step S801 is not necessary if the group of three scalar values of R, G and B are output from the camera. Then in steps S802 to S804, each frame synthesis for the R, G and B components is executed, and the synthesizing results are integrated to provide the target frame 831 after the synthesis. In the process from step S802 to step S804, the same frame synthesizing method while having different input/output may be employed, or different frame type may also be employed.

FIG. 8B represents a sequence which is different from the one shown in FIG. 8A. In the sequence, the reference frame 822 is subjected to the exception removing process in step S815 for removing the reference frame which makes the correlation of the frames difficult under the influence of large movement of the camera 110. Then values corresponding to RGB components are calculated for the target frame 821 and the reference frame 822 in step S816. In step S812, the frame synthesis is executed using the R and G component values. Likewise, the frame synthesis is executed in step S813 using G and B component values, and using B and R component values in step S814. The resultant frames are integrated to provide the target frame 832 after the synthesis.

The frame synthesizing process such as the exception removing process (S815) may be partially executed in common as the sequence shown in FIG. 8B, or the process may be executed to the component other than the RGB components. Over the entire sequence shown in FIG. 8B, it is sufficient so long as the process for calculating the denoising level is executed separately for values of the respective components. The R, G and B component values may be processed collectively likewise steps S812 to S814.

When using the camera other than the RGB camera, the process may be executed through the same sequence. The signal sent from the camera may be of NTSC type or PAL type. The signals obtained by the camera are not necessarily transmitted as they are. The signal may be deteriorated in the process of executing the series of operations of converting the signal obtained by the camera to be adapted to the aforementioned type, transmitting the data to the image fetching unit, and subjecting the transmitted signal to the process for calculating the value of the component corresponding to the light-receiving type of the camera.

Example 2

Example 2 of the present invention will be described.

Figure 9:
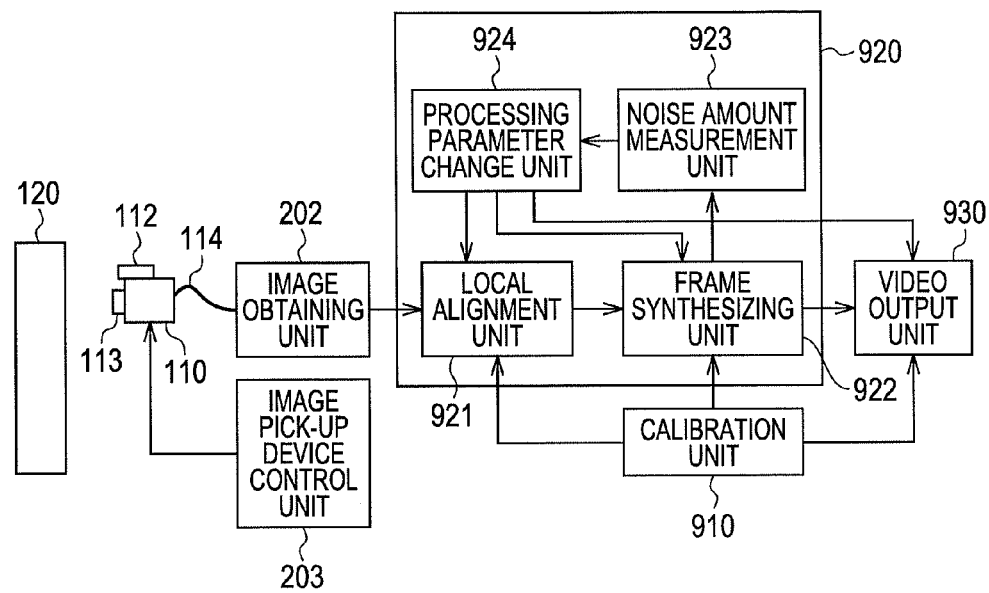
FIG. 9 is a block diagram illustrating a basic structure of the visual inspection apparatus according to Example 2 of the present invention.

FIG. 9 illustrates the structure of the visual inspection apparatus according to Example 2 of the present invention. The units having the same structures as those described in Example 1 referring to FIG. 1 are designated with the same reference numerals. The structure shown in FIG. 9 is configured by adding a noise amount measurement unit 923 for measuring the noise amount, and a processing parameter change unit 924 for changing the processing parameters which relate to the alignment process, frame synthesizing process or the image output process, both of which form a noise removing unit 920. The apparatus is further provided with a calibration unit 910 for generating a deteriorated image through pseudo superimposing of noise on the image for calibration and generating the interface for adjusting the processing parameter, as the calibration process executed before inspection.

The image pick-up device 110 is provided with an optical camera 113. The image pick-up device 110 is only brought to be close to the inspection object 120 for inspection. Those units 101 to 105 except the image pick-up device are placed outside the environment with high radiation dose. The image pick-up device 110 may be provided with the lighting unit 112 or the device drive unit (not shown). The image of the inspection object 120 picked up by the optical camera 113 is obtained by the image obtaining unit 202. The optical camera 113 is capable of picking up the color image or gray scale image. An image pick-up tube, CCD, and CMOS may be employed as the optical camera 113. An image pick-up device control unit 203 controls the image pick-up device.

The image from the image pick-up device 110 is transmitted to an image obtaining unit 2020 via the cable 114. Wireless communication is available between the image pick-up device 110 and the image obtaining unit 202. Upon reception of signals from a processing parameter change unit 924 and the calibration unit 910, alignment of the plurality of frames is conducted in a local alignment unit 921. Likewise, upon reception of signals from the processing parameter change unit 924 and the calibration unit 910, a frame synthesizing unit 922 synthesizes the aligned frames. The image formed of the synthesized frames is displayed or recorded by a video output unit 930.

Figure 10:
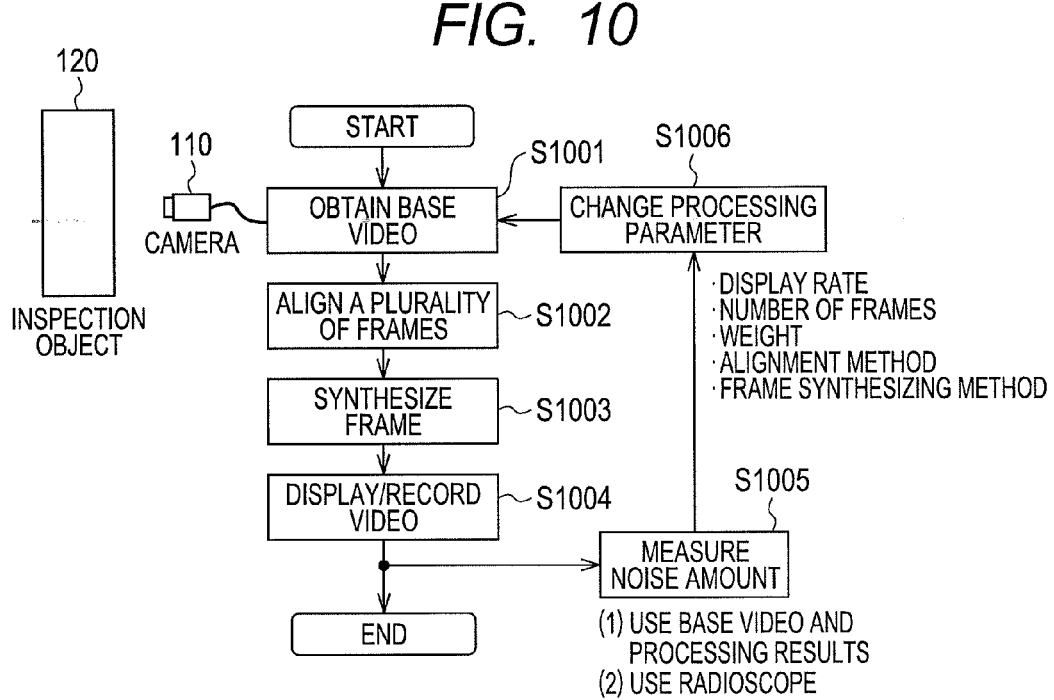
FIG. 10 is a flowchart representing the process for denoising by processing the image having the radiation noise superimposed according to Example 2 of the present invention.

FIG. 10 represents the flow of the process executed using the apparatus shown in FIG. 9 according to Example 2. Steps S1001 to S1004 are the same as those described in Example 1 shown in FIG. 2. In step S1005, the amount of noise superimposed on the image obtained in step S1001 is measured. The noise amount may be measured through the image processing using any one of the frame derived from the frame synthesis in step S1003 or the frame for forming the image derived from the camera. Alternatively, the noise amount may be measured using the device for measuring radiation dose such as Geiger counter. Then in step S1006, processing parameters which relate to alignment in step S1002, frame synthesis in step S1003, or image output in step S1004 are adjusted in accordance with the measured noise amount. The adjustable processing parameter includes display rate, number of frames used for the frame synthesis, weight of the frame synthesis, alignment method, frame synthesizing method and the like.

The appropriate radiation noise removing method executed by a denoising unit 920 differs dependent on the radiation noise amount. For example, if the noise amount is small, good image quality may be obtained in the process using a small number of frames. On the contrary, if the noise amount is large, complicated process needs to be used for executing high-performance denoising. When using a large number of frames and complicated process, disadvantage such as prolonged processing time may occur. Then the processing parameters are appropriately changed in accordance with the radiation noise amount so as to obtain good image quality while suppressing the processing time irrespective of the noise amount. The processing parameters such as the display rate, number of frames, synthesizing method, weight, alignment method, and frame synthesizing method may be adjusted. The processing parameters may include parameter for determining whether or not the alignment process is executed, and whether or not the frame synthesizing process is executed.

Figure 11A:
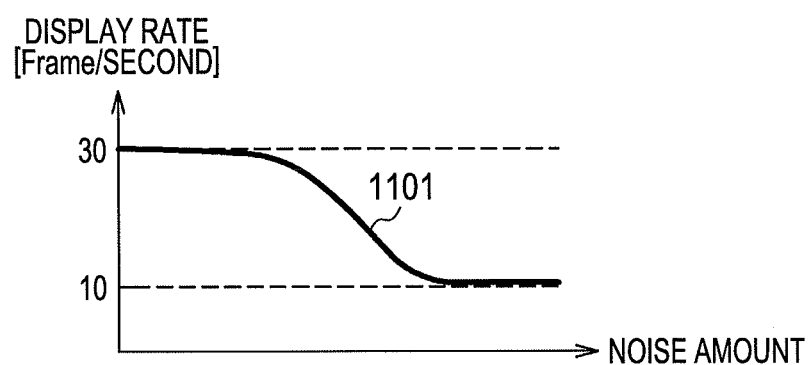
FIG. 11A is a graph showing relationship between noise amount and display rate, which represents the method for changing the display rate in accordance with the measured noise amount according to Example 2 of the present invention.
Figure 11B:
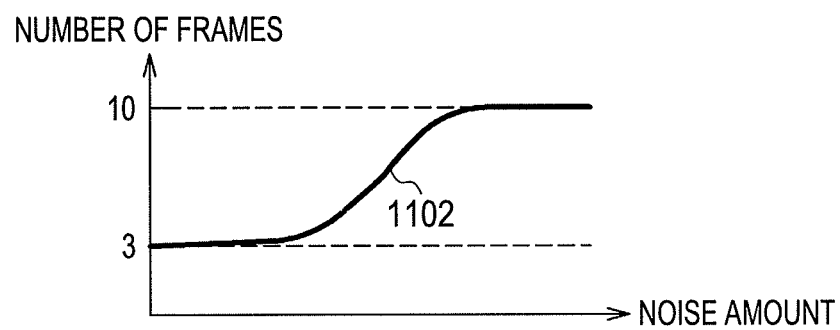
FIG. 11B is a graph showing relationship between noise amount and the number of frames, which represents the method for changing the display rate in accordance with the measured noise amount according to Example 2 of the present invention.

FIGS. 11A and 11B represent an example of the process for changing processing parameters executed in step S1006 shown in FIG. 10, which describe the method for changing the display rate in accordance with the measured noise amount. The relationship between noise amount and the display rate as shown in graph 1101 of FIG. 11A is preliminarily recorded in a memory (not shown). In this example, if the noise amount is considerably low, the display rate of 30 Frame/second is set. On the contrary, if the noise amount is considerably high, the rate reduced to 10 Frame/second is set. The rate of the image derived from the camera is fixed. The display rate is decreased as the noise amount is increased so as to increase calculation amount applicable for a single frame to be displayed. The display rate is set to be in the range from 10 to 30 Frame/second in accordance with the noise amount so that the display rate is monotonically decreased to the noise amount. The relationship between the noise amount and the display rate may be manually set prior to or during the inspection.

Meanwhile, the processing parameters are adjusted so that the high performance process is executed in spite of high calculation amount which is increased as the noise amount becomes large. For example, referring to a graph 1102 shown in FIG. 11B, as the noise amount becomes larger, the denoising level is raised by increasing the number of frames. In the case of a large noise amount, the display rate of the image derived from the frame synthesis may be increased, instead of lowering, by interpolating toward the time direction.

As the radiation noise amount is increased, more computation is required for denoising while keeping the signal component. The device with limited computation capability has to sacrifice the denoising performance unless the display rate and recording rate are lowered. For the inspector, it is often the case that the image with less noise amount may be easily inspected in spite of slightly lowered rate compared to the case where the image with a larger noise amount is inspected for displaying or recording at a higher rate. Then the display rate or the recording rate may be changed in accordance with the radiation noise amount for processing while maintaining the higher rate in the case of a small noise amount, and while emphasizing the image quality in the case of a large noise amount.

Figure 12:
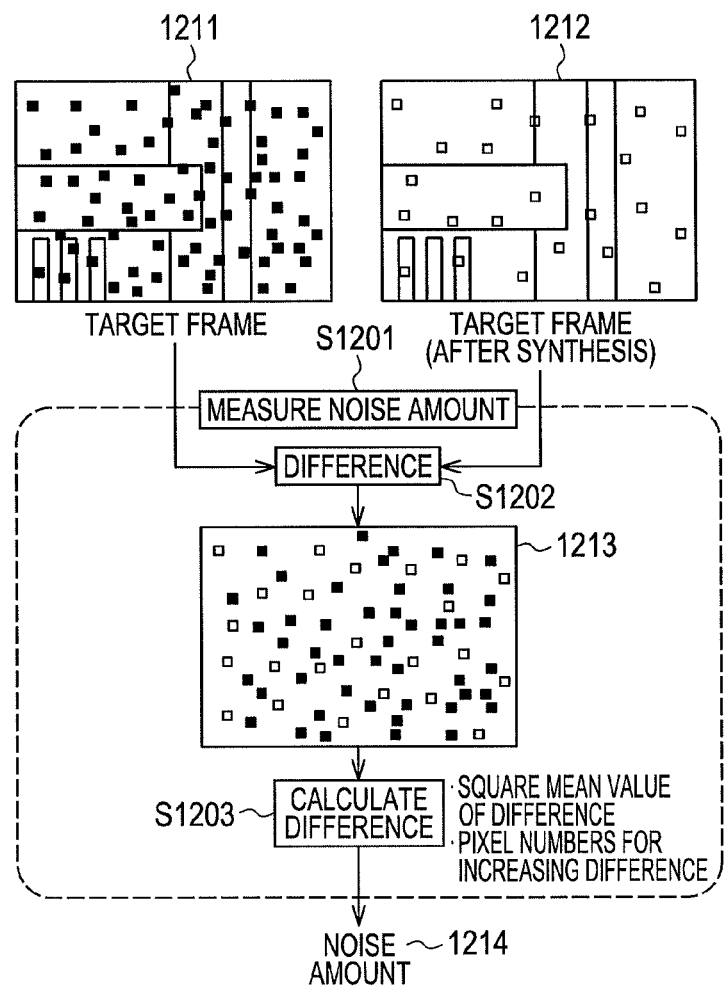
FIG. 12 represents the flow of the process for measuring the noise amount according to Example 2 of the present invention.

FIG. 12 represents an exemplary method for measuring the noise amount, which is executed in noise amount measurement step S1005. The difference between a target frame 1211 before frame synthesis and a target frame 1212 after the frame synthesis is calculated in step S1202. A frame 1213 obtained by calculating the difference hardly contains signal components, but high content of noise components. Then the difference with respect to the frame 1213 is calculated in step S1203, and the obtained difference is set to a noise amount 1214. In the process of calculating the difference, the average of square values of brightness values for all the pixels may be set to the difference, or the number of pixels at a time when the brightness value of the frame 1213 becomes constant or larger than a constant value. The noise amount may be obtained for each frame, or at a preset interval.

The radiation noise amount may be measured using the image derived from the camera. The radiation noise needs to be extracted with accuracy from the image upon measurement of the noise amount. For example, the frame difference between the timings before and after the frame synthesis is calculated as in step S1202, for example, to allow extraction of the radiation noise with relatively high accuracy without adding complicated process for measuring the radiation noise amount.

Figure 13:
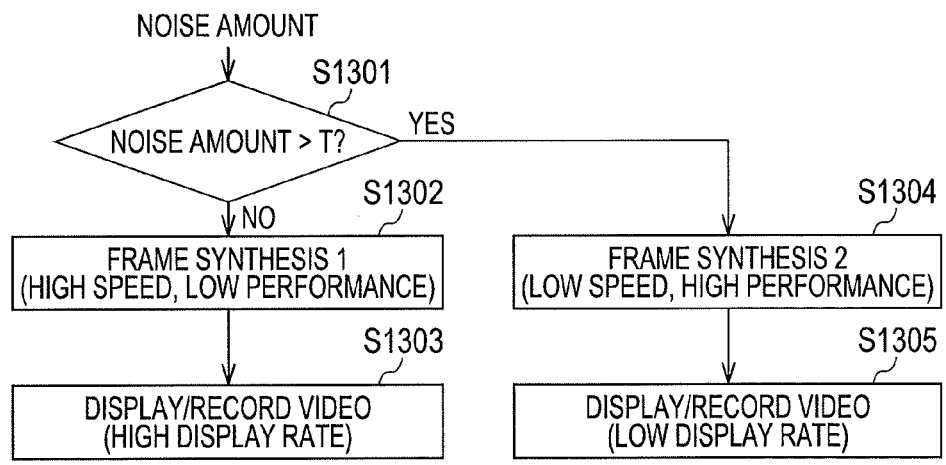
FIG. 13 represents the flow of the process for switching the frame synthesizing method as one of methods for changing processing parameters according to Example 2 of the present invention.

FIG. 13 represents an exemplary sequence of the method for switching frame synthesizing method as one of the methods for changing the processing parameters in the processing parameter change step S1006 as shown in FIG. 10. In step S1301, the measured noise amount and the preset threshold value T are compared. If the noise amount is equal to or smaller than the threshold value T, the process proceeds to step S1302 where the frame synthesis is executed at a high rate but with performance not so high. Then in step S1303, the image after the frame synthesis is displayed or recorded at a high display rate. Meanwhile, if the noise amount is larger than the threshold value T, the process proceeds to step S1304 where the frame synthesis is executed at a low rate but with high performance. Then in step S1305, the image after the frame synthesis is displayed or recorded at a low display rate. For example, the high rate frame synthesis is explained as the process using buffer referring to FIG. 5C, and the low rate frame synthesis is explained as the process of weight average referring to FIG. 5B. However, they are not limited to those described herein. The frame synthesizing method is switched to realize the display rate and the denoising performance in accordance with each value of the noise amount.

The example for switching the frame synthesizing method has been described herein. The sequence for switching the alignment may be executed as well. Referring to FIG. 13, the method is switched between two frame synthesizing methods. However, it may be switched among three or more methods.

Figure 14A:
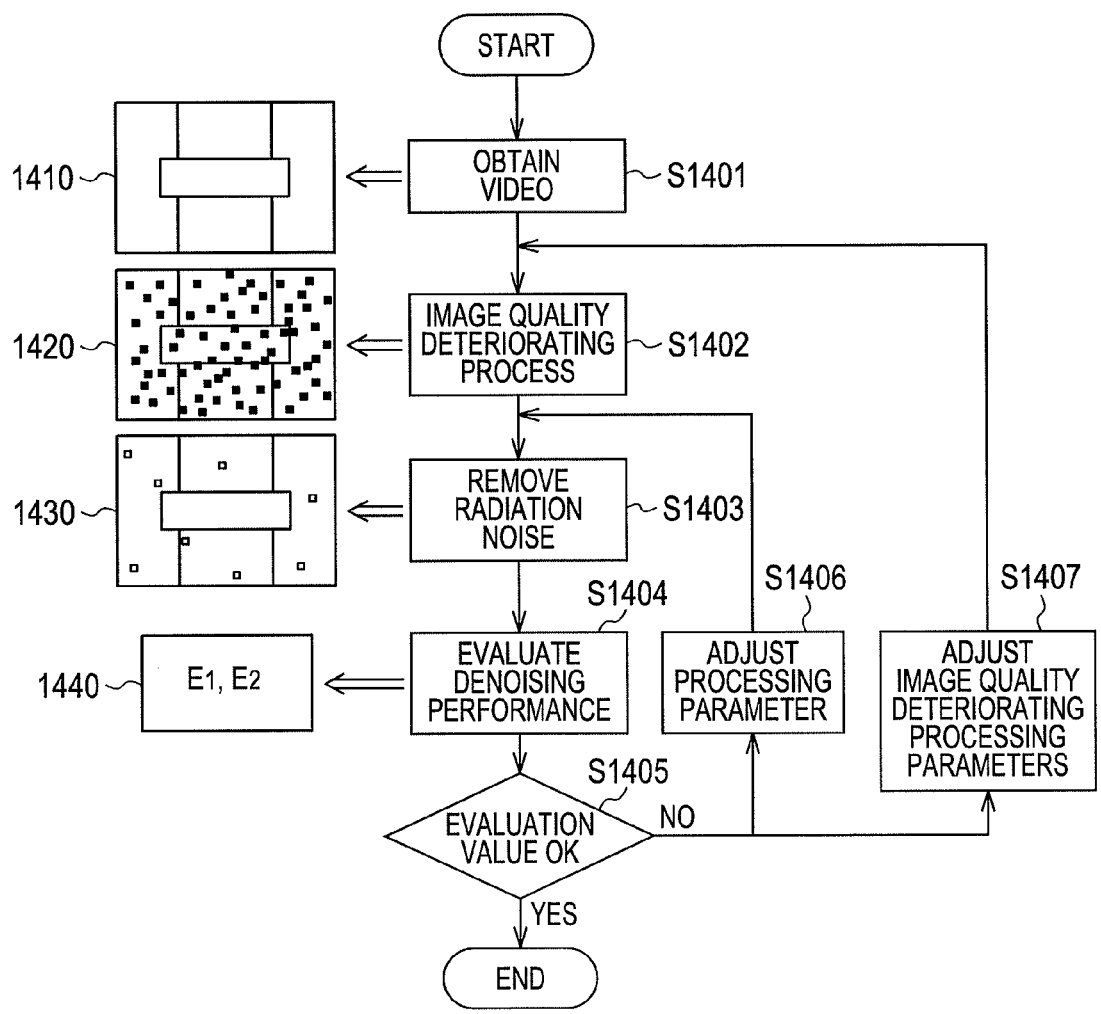
FIG. 14A is a flowchart representing the process for automatically executing the denoising performance evaluation according to Example 2 of the present invention.

FIG. 14A represents an exemplary sequence for adjusting the processing parameters for alignment, frame synthesis, or image output which are carried out as the calibration beforehand the inspection. A base image 1410 for calibration is obtained (S1401), and quality of the obtained base image is deteriorated (S1402) to generate the deteriorated image as indicated by 1420. In deterioration in the image quality, the image is processed by superimposing the noise that models the radiation noise, or adding fluctuation.

The deteriorated image 1420 is subjected to the radiation noise removing process (S1430) to obtain a denoised image 1430. Based on the denoised image 1430, the denoising performance is evaluated (S1404) to obtain an evaluation value 1440. Comparison is made between the obtained evaluation value 1440 and the preset reference value (S1405). If the evaluation value 1440 is smaller than the preset reference value, the calibration is finished. Meanwhile, if the evaluation value 1440 is larger than the preset reference value, the processing parameters are adjusted (S1406). The adjusted processing parameters are applied to the radiation noise removing process step (S1403). The aforementioned operation is repeatedly executed until the evaluation value becomes smaller than the preset reference value.

In the aforementioned process, the processing parameters in the radiation noise removing step (S1403) are adjusted in S1406. However, parameters for image deterioration process concerning the image quality deterioration process in the image quality deterioration process step (S1402) may be adjusted (S1407). It is possible to adjust both the deterioration parameters and the processing parameters for denoising with respect to each noise amount.

The base image 1410 may be the picked up one of the object, the one obtained by subjecting the picked up image to image processing (for example, the one obtained by subjecting the image having radiation noise superimposed to denoising process that is the same as or different from the process executed in S1403), or the one obtained by pseudo addition of the structure to be inspected (for example, flaw and foreign substance) to the picked up image.

Evaluation of the denoising performance (S1404) is conducted based on magnitude of difference between the base image 1410 and denoised image 1430, that is, E1 (for example, error of means square), or slowness of the display rate, that is, E2. The smaller those values become, the better the performance is evaluated. For example, the processing parameters may be adjusted so that the sum total of those values of E1 and E2 becomes small.

FIG. 14A represents the case where calibration is automatically executed. However, the processing parameters may be manually adjusted, and the process is represented in FIG. 14B.

Referring to the flowchart of FIG. 14B, likewise the case shown in FIG. 14A, the base image for calibration is obtained (S1451). Quality of the base image is deteriorated (S1452) to form the deteriorated image. The method for deteriorating the image is the same as the method described referring to FIG. 14A.

Then the deteriorated image is subjected to radiation noise removing process (S1453), and the operator determines whether or not the processing parameters need to be adjusted based on the denoising result. If the operator determines that it is necessary to conduct adjustment, the processing parameters are adjusted (S1455) and image quality deteriorating processing parameters are adjusted (S1456). The adjusted parameters are applied to the image quality deterioration process (S1452) and the radiation noise removing process (S1453) so as to execute the radiation noise removing again. If the operator determines that it is not necessary to adjust the processing parameter, the calibration is finished.

The calibration function allows adjustment of the processing parameters for radiation noise removing process before inspection so that the inspector easily observes the image. Compared to the case where the processing parameters are adjusted for each inspection, this function provides advantage of reduced inspection time. The image which contains no radiation noise is obtained as the image for calibration so that the denoised image and the image which contains no radiation noise are compared. This makes it possible to accurately confirm as to the level to which the signal component has been deteriorated by the denoising process, or to check the denoising performance upon change in the noise amount.

If denoising in S1403 shown in FIG. 14A or in S1453 shown in FIG. 14B corresponds to the process for local alignment and frame synthesis, display rate, number of frames, synthesizing method, weight, alignment method, and frame synthesizing method are applicable as the processing parameters for denoising. The denoising executed in step S1403 or S1453 is not necessarily the process for the local alignment and frame synthesis.

FIG. 15 represents detailed process for deteriorating image quality executed in S1402 shown in FIG. 14A or in S1452 shown in FIG. 14B. The base image 1410 for calibration is subjected to such process as addition of fluctuation (S1501), brightness fluctuation (S1502), and superimposing of noise (S1503). The order for executing the aforementioned processes may be different from the one shown in FIG. 15. Steps 1513 to 1515 represent examples of deterioration parameters employed in the image quality deteriorating process S1402 or S1452. In the process for adding fluctuation (S1501), for example, based on the fluctuation parameter 1513 as fluctuation width and fluctuation cycle, fluctuation is generated. The parameters 1514 for brightness fluctuation process (S1502) include amount of fluctuation in brightness, fluctuation cycle, the local region to which fluctuation is added and the like.

Parameters 1515 for noise superimposing process (S1503) include type of the camera (for example, RGB camera, CMY camera and the like), and noise amount. The inspection object (for example, core support plate, jet pump and the like) are allowed to be designated instead of noise amount. In this case, the relationship between the inspection object and estimated value of amount of superimposed noise upon image pick-up of the object is preliminarily recorded in the database 1504 so that the radiation noise by the amount corresponding to the designated inspection object is superimposed in the noise superimposing process (S1503).

Execution of the image deterioration allows confirmation of processing results upon incidence of fluctuation, brightness fluctuation, and superimposing of noise which are expected to occur upon inspection so as to set the processing parameters for radiation noise removing which are hardly influenced by the deterioration as described above.

Figure 16:
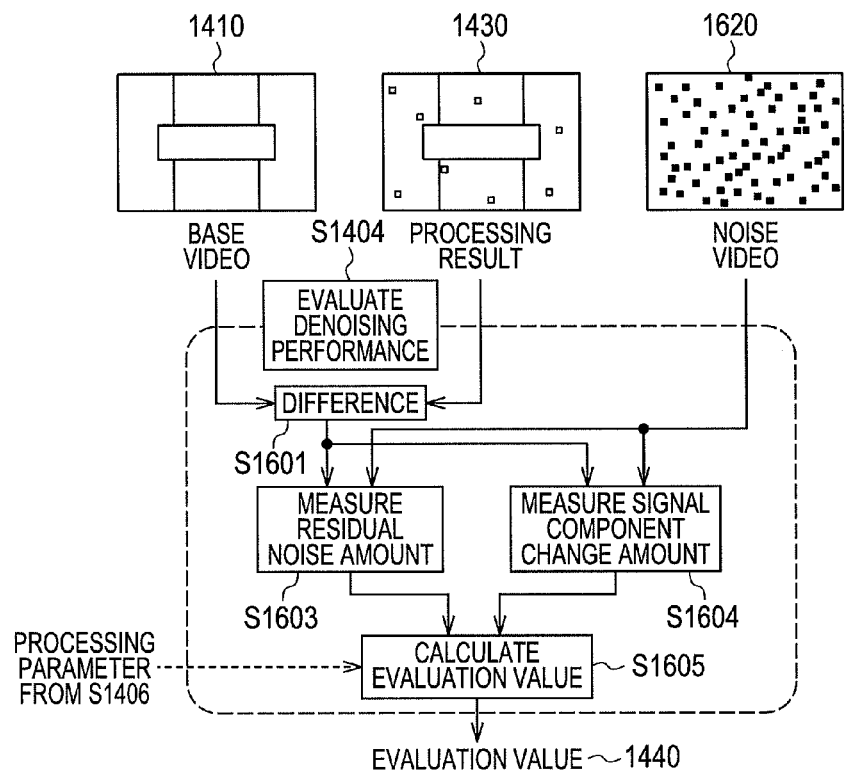
FIG. 16 represents the flow of the process for executing the denoising performance evaluation according to Example 2 of the present invention.

FIG. 16 represents the denoising performance evaluation step (S1404) shown in FIG. 14A in detail. The difference between the base image 1410 obtained in the image obtaining step (S1401) and the denoised image 1430 which has been processed in the radiation noise removing step (S1403) is calculated (S1601). The difference contains residual noise and signal component which has changed through the radiation noise removing process (S1403). Then the amount of the residual noise in the image 1430 processed in the radiation noise removing step (S1403) is measured (S1603) using the noise image 1620 formed of the superimposed noise upon image quality deterioration of the base image, and the differential image calculated in S1601. Use of the noise image allows the signal contained in the differential image to be split into the residual noise and the changed signal component. The amount of change in the signal component is measured using the noise image 1620 and the differential image (S1604).

An evaluation value 1440 indicating denoising performance is calculated (S1605) based on the change amount of the signal component derived from the residual noise amount measured in the residual noise amount measurement step (S1603) and the change amount of the signal component measured in the signal component change amount measurement step (S1604). Calculation of the evaluation value 1440 may be conducted using the processing parameters (for example, display rate) set in the processing parameter adjustment step S1406 shown in FIG. 14A. In evaluation value calculation step (S1605), as each of the amounts E1$n$ indicating the residual noise amount, E1$s$ indicating change amount of the signal component, and E2 indicating slowness of the display rate becomes smaller, it may be evaluated that the performance is excellent. The sum total of the aforementioned amounts E1$n$+E1$s$+E2 is output as the evaluation value 1440.

Figure 17:
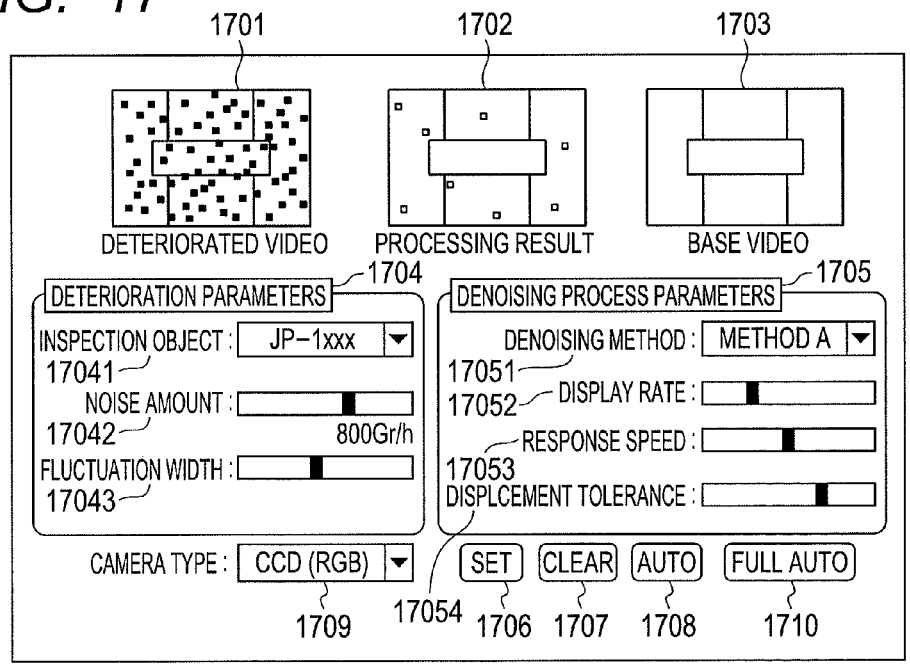
FIG. 17 is a front view of a calibration screen displayed upon calibration according to Example 2 of the present invention.

FIG. 17 shows an example of the calibration screen displayed upon execution of calibration shown in FIGS. 14A and 14B, which indicates a deteriorated image 1701 (corresponding to the image 1420 shown in FIG. 14A), a processing result 1702 after radiation noise removing (corresponding to image 1430 shown in FIG. 14A), and a base image 1703 before deteriorating image quality (corresponding to the image 1410 shown in FIG. 14A). As indicated by 1704, an interface for adjusting the deterioration parameter is provided, and as indicated by 1705, an interface for adjusting the processing parameters which relate to the radiation noise removing is provided.

The interface 1704 for adjusting the deterioration parameter includes an inspection object setting unit 17041 for designating the inspection object, a noise amount setting unit 17042 for setting the noise amount, and a fluctuation width setting unit 17043 for setting the fluctuation width. The interface 1705 for adjusting the denoising processing parameters includes a denoising method designation unit 17051 for designating the denoising method, a display rate setting unit 17052 for setting the display rate, a response rate setting unit 17053 for setting the response rate, and a displacement tolerance setting unit 17054 for setting the displacement tolerance.

An interface 1709 for designating type of the camera is provided. Further, there are provided an automatic button 1708 for automatically adjusting the processing parameter with respect to designated deterioration parameters, and a full automatic button 1710 for automatically adjusting the processing parameters with respect to the plurality of deteriorated parameters. The inspector is allowed to appropriately adjust the processing parameters upon calibration while comparing the deteriorated image 1701 and the processing result 1702, or the processing result 1702 and the base image 1703 on this screen with relatively lower burden.

Figure 18:
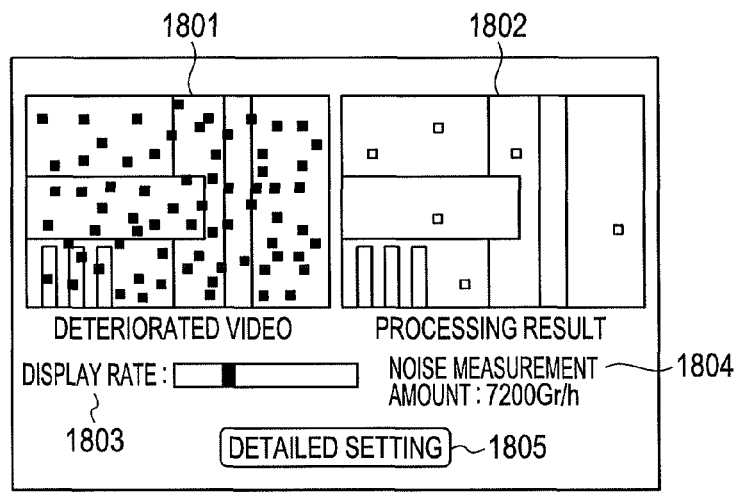
FIG. 18 is a front view of an image shown on the display upon inspection according to Example 2 of the present invention.

FIG. 18 represents an example of a screen output on the display upon inspection for displaying a deteriorated image 1801 (corresponding to the image 1420 shown in FIG. 14A), and a processing result 1802 after radiation noise removing (corresponding to the image 1430 shown in FIG. 14A). An interface for changing the display rate 1803, and an interface for setting the processing parameter in detail (for example, the screen for the processing parameter adjustment appears upon depression of a detailed setting button 1805). The noise amount measured like 1804 may be displayed.

If the structure allows the inspector to observe not only the image after radiation noise removing but also the image before radiation noise removing simultaneously, more information may be obtained, thus improving usability. For example, the radiation noise amount may be visually confirmed, and the processing parameters for radiation noise removing upon inspection may be easily adjusted while observing both images.

Example 3

Figure 20A:
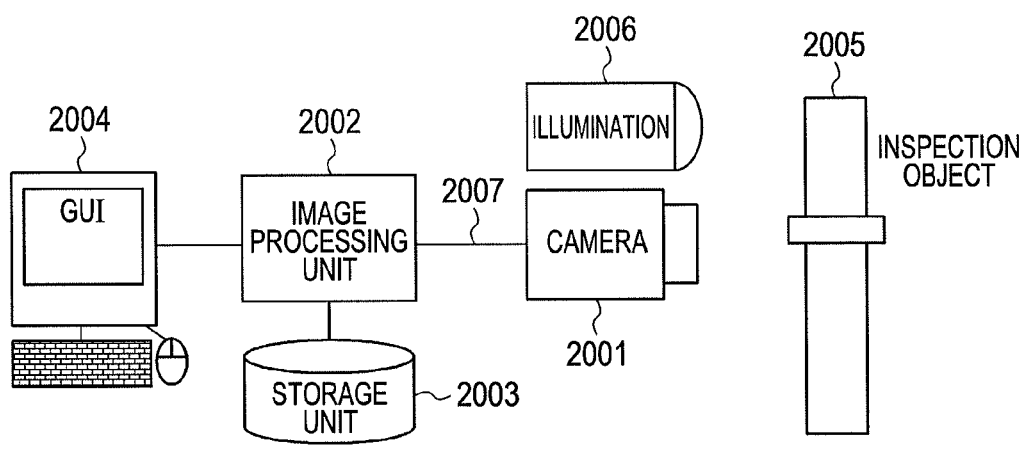
FIG. 20A is a block diagram illustrating a brief structure of the inspection apparatus according to the embodiment of the present invention.
Figure 20B:
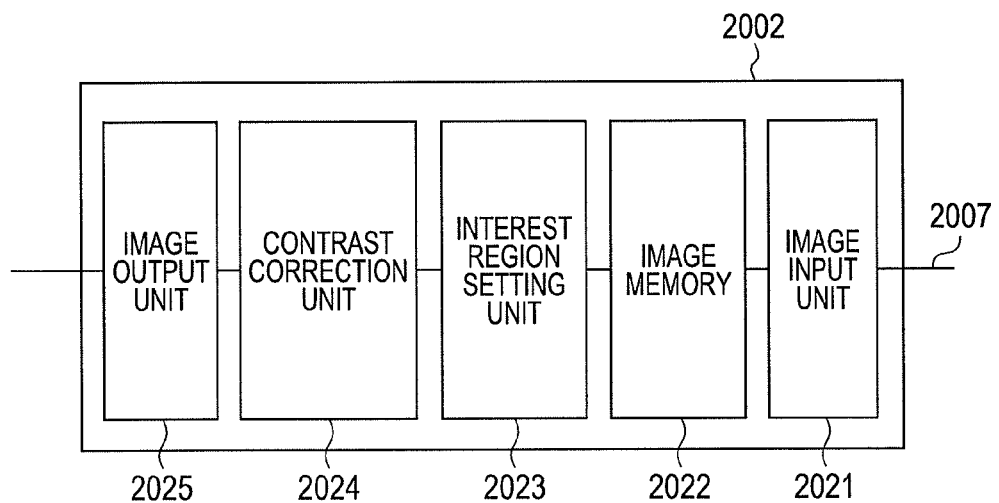
FIG. 20B is a block diagram illustrating a structure of an image processing unit of the inspection apparatus according to the embodiment of the present invention.

FIG. 20A illustrates a basic structure of an inspection apparatus (visual inspection) according to an embodiment of the present invention. The inspection apparatus is formed of, for example, a camera 2001, an image processing unit 2002, a storage unit 2003, and a GUI 2004. If an inspection object 2005 is a nuclear reactor that greatly influences by radiation, the camera 2001 is only brought to be close to the inspection object 2005 for inspection. The image processing unit 2002, the storage unit 2003, and the GUI 2004 except the camera 2001 are placed outside the environment exposed to high radiation dose. The camera 2001 may be provided with a lighting unit 2006 and a drive unit (not shown). The lighting unit 2006 illuminates the inspection object 2005. The camera 2001 obtains an image of the inspection object 2005 by picking up. The camera 2001 is capable of picking up the color image or the gray scale image. An image pick-up tube, CCD, and CMOS may be employed as the optical camera 2001. The image from the camera 2001 is transmitted to the image processing unit 2002 via a cable 2007. Wireless communication is available between the camera 2001 and the image processing unit 2002. As illustrated in FIG. 20B, the image processing unit 2002 includes an image input unit 2021 for inputting the image (video image) picked up by the camera 2001, an image memory unit 2022 for temporarily storing the input image, an interest region setting unit 2023 for setting the interest region using the image stored in the image memory unit 2022, a contrast correction unit 2024 for correcting the contrast of the interest region set by the interest region setting portion 2023, and an image output unit 2025 for outputting the image having the contrast of the interest region corrected. The image processing unit 2002 outputs the contrast corrected image and the image before correction from the image output unit 2002 so as to be displayed on the GUI 2004, and recorded in the storage unit 2003 for storage.

Figure 19:
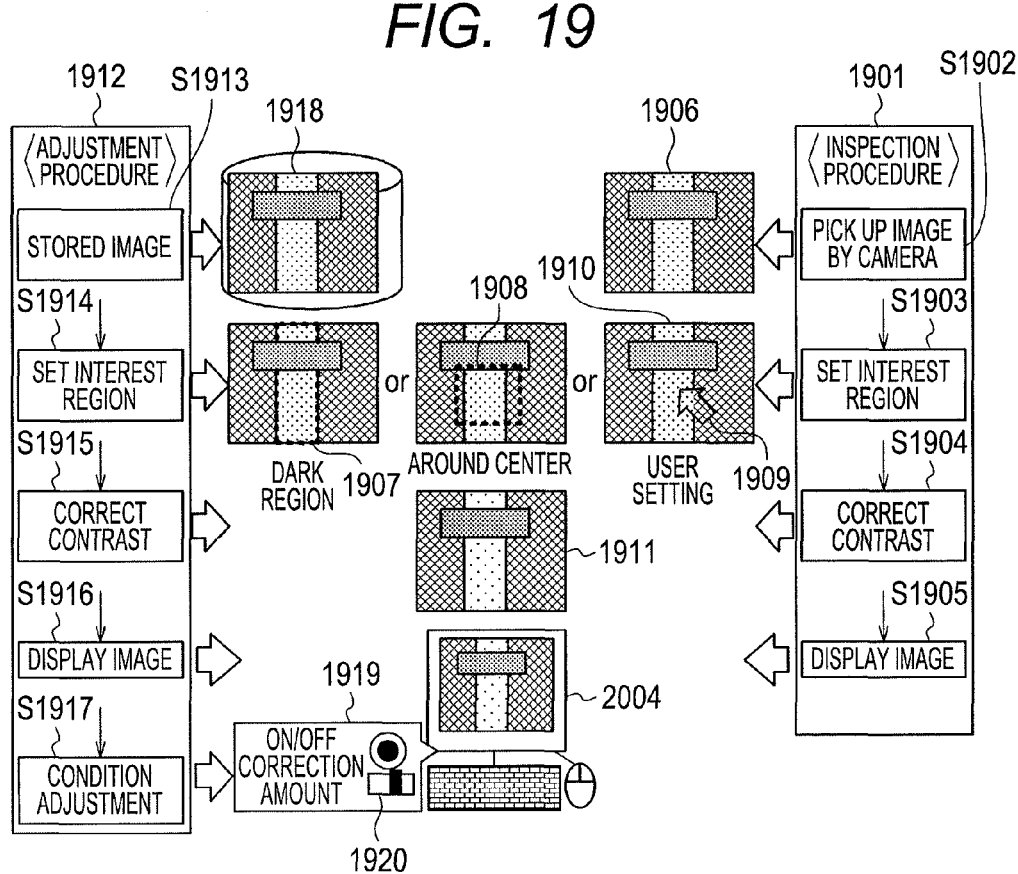
FIG. 19 represents an exemplary flow of a sequence for visual inspection according to an embodiment of the present invention.

FIG. 19 illustrates a sequence of inspection (visual inspection) according to an embodiment of the present invention. The inspection sequence includes an adjustment procedure 1912 conducted before inspection, and an inspection procedure 1901 for actual inspection.

The adjustment procedure 1912 includes stored image obtaining step S1913, interest region setting step S1914, contrast correction step S1915, image display step S1916, and condition adjustment step S1917.

In stored image obtaining step S1913, the image 1918 stored upon the previous inspection is obtained from the storage unit 2003. Alternatively, the image of the pseudo inspection object as a model of the inspection object 2005, which is picked up by the camera 2001 may be obtained. Preferably, the pseudo inspection object is modeled as the three-dimensional complicated structure so as to reproduce the state where the lighting condition is partially insufficient or excessive.

The interest region setting step S1914 sets the interest region of the obtained image likewise the inspection procedure.

Contrast correction step S1915 subjects the interest region to the contrast correction image processing under the preset condition likewise the inspection procedure, and generates the corrected image.

The image display step S1916 displays the corrected image on the GUI 2004 for visual inspection likewise the inspection procedure.

In the condition adjustment step S1917, the user confirms the displayed image so as to adjust the image processing condition on the GUI 2004 when needed. The screen for inputting parameters required for the image processing is displayed on the GUI 2004, which includes, for example, a button 1919 for inputting ON/OFF with respect to the contrast correction process, and an adjustment gauge 1920 for inputting the level of the contrast correction process. When confirming the illuminated state, it is preferable to select OFF from ON/OFF of the contrast correction process. When confirming the contrast correction state, it is preferable to set ON. Preferably, the level of the contrast correction process is adjusted to relatively high level when the correction is insufficient. It is adjusted to relatively low level when the correction is excessive.

The inspection procedure 1901 is formed of camera pick-up step S1902, interest region setting step S1903, contrast correction step S1904, and screen display step S1905. As video image is picked up by the camera, the aforementioned steps are repeatedly executed for the respective frames. In the camera pick-up step S1902, an image 1906 of the inspection object 2005 picked up by the camera 2001 is obtained.

The interest region setting step S1903 sets the interest region of the obtained image 1906. With the method for setting the region, for example, a region 1907 which is darker or brighter than the preset reference brightness is automatically set to the interest region. A portion 1908 around the center of the image is automatically set to the interest region. Alternatively, the user sets an arbitrary point 1910 on the GUI to the interest region using a mouse cursor 1909.

In the contrast correction step S1904, the interest region is subjected to the contrast correction image process under the preliminarily adjusted condition or the preset condition to generate a corrected image 1911. The screen display step S1905 displays the corrected image 1911 on the GUI 2004 for visual inspection.

The sequence for inspection does not necessarily require execution of the adjustment procedure 1912 before inspection. In this case, the contrast correction image processing is executed under the preset condition in contrast correction step S1904 of the inspection procedure 1901.

Figure 21A:
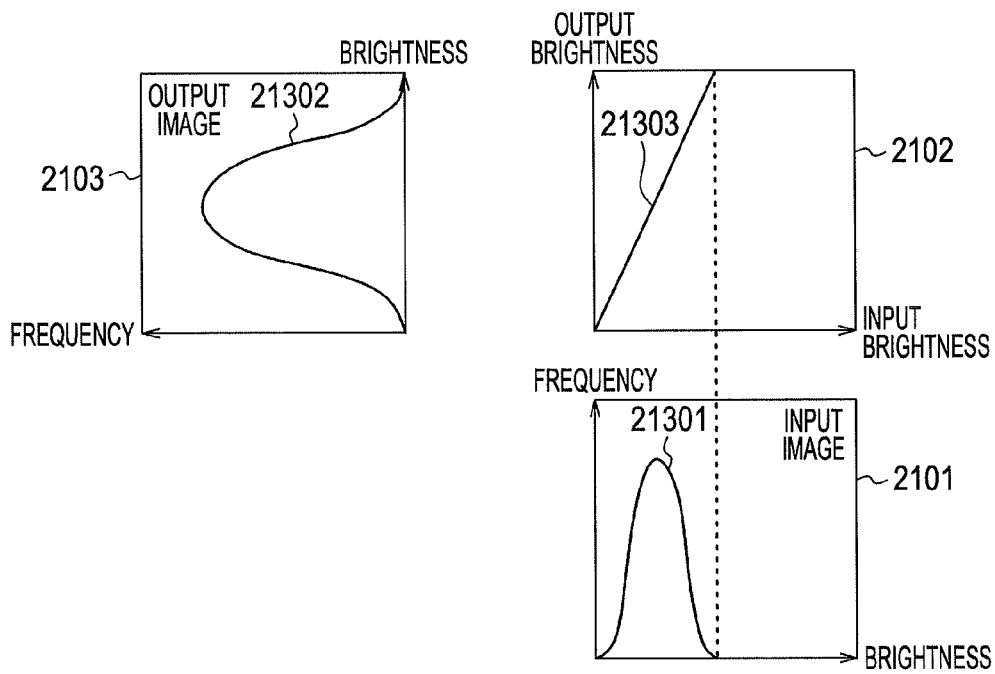
FIG. 21A shows graphs as examples of general contrast correction, specifically, the graph indicating the frequency distribution of brightness of the input image in the presence of deviation, the graph indicating the correction function, and the graph indicating the frequency distribution of brightness of the output image.

The contrast correction process executed in contrast correction step S1915 or S1904 will be described. FIG. 21A represents an example of general contrast correction. Referring to a graph 2101 shown in FIG. 21A, when frequency distribution 21301 of brightness of a certain input image is obtained, distribution bias is observed in the dark side. In the aforementioned state, it is preferable to use the brightness distribution in the range from minimum and maximum values. Linear extension is one of generally employed contrast correction processes for realizing the use of the brightness distribution. In the case where the brightness distribution of the obtained image is partially biased in the range from the minimum to the maximum values, as the graph 2102 shown in FIG. 21A, the distribution is linearly extended in the range from the minimum to maximum range. If the linear extension is applied, the frequency distribution 21302 of brightness of the output image as shown in a graph 2103 shown in FIG. 21A distributes in the range from the minimum to the maximum values while holding the shape of concentration distribution. The linear extension function 21303 shown in the graph 2102 of FIG. 21A extends the input brightness range from the minimum to the maximum values so as to be converted to the output brightness range.

Figure 21B:
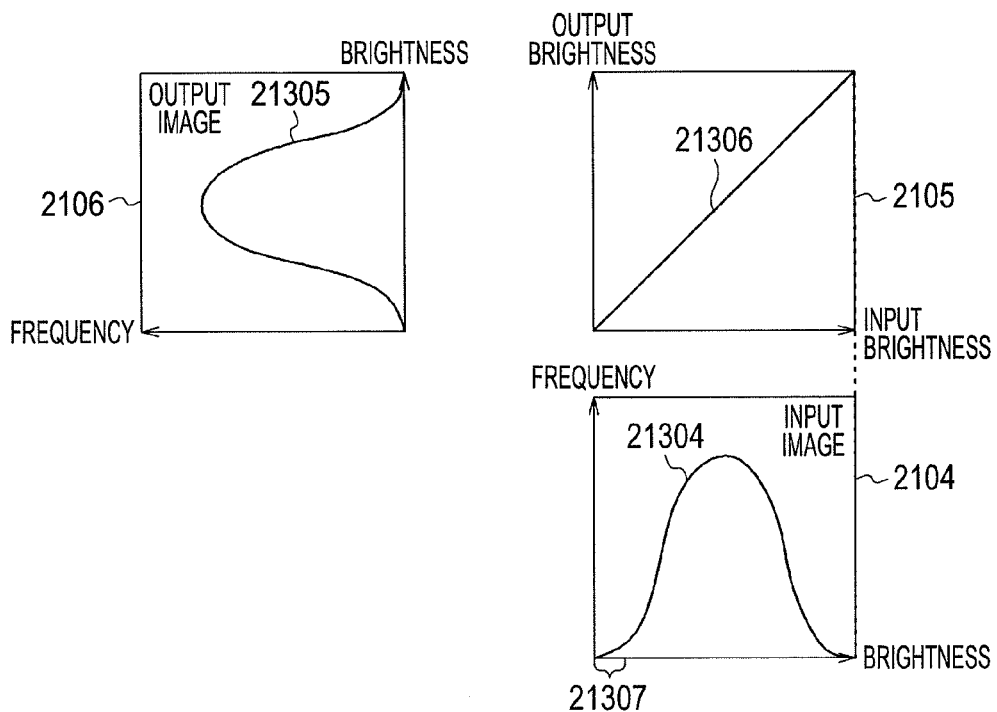
FIG. 21B shows graphs as examples of general contrast correction, specifically, the graph indicating the frequency distribution of brightness of the input image in the absence of deviation, the graph indicating the correction function, and the graph indicating the frequency distribution of brightness of the output image.

Meanwhile, FIG. 21B represents an example in which the frequency distribution of input image brightness has no bias. When a frequency distribution 21304 of brightness of the input image shown in a graph 2104 of FIG. 21B ranges from the minimum to maximum values, the frequency distribution 21305 of the output image brightness becomes similar to that of the input image without extension as a graph 2106 of FIG. 21B shows. A contrast correction function 21306 in this case is formed as a straight line at gradient of 1 as indicated by a graph 2105 of FIG. 21B.

The sensitivity of visual feature of a human tends to be low with respect to the significantly dark range 21307 of the brightness distribution shown in the graph 2104 of FIG. 21B. In order to improve visibility, it is preferable to correct the very dark range 21307 to the bright side.

Figure 22A:
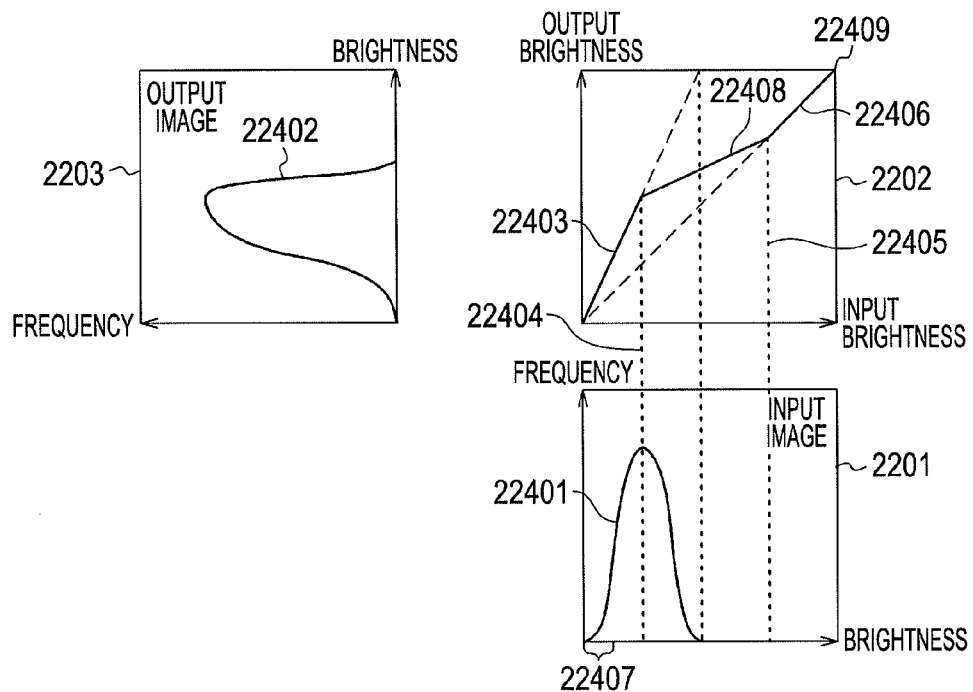
FIG. 22A shows graph indicating the frequency distribution of brightness of the input image as an example of the contrast correction while enlarging the distribution at a dark side set as an interest region, a graph indicating a correction function, and a graph indicating the frequency distribution of brightness of the output image.

FIG. 22A represents an example of contrast correction for automatically setting the dark region to the interest region. In this example, referring to a graph 2201 of FIG. 22A, a lower limit value 22404 and a upper limit value 22405 of the correction adjustment are set with respect to the input image with a brightness frequency distribution 22401 similar to the graph 2101 shown in FIG. 21A.

Referring to a graph 2202 of FIG. 22A, if the input brightness 22401 of the input image is equal to or smaller than the lower limit value 22404 of the correction adjustment, the extension function 22403 may be applied as it is. Arbitrary function may be applied so long as the effect for extending the brightness range of the interest region without being limited to the linear extension. In the following description, it is not limited to the linear extension.

If the input brightness is equal to or higher than the upper limit value 22405 of the correction adjustment, the function 22406 at the gradient of 1, which does not correct the contrast, is applied. If the input brightness is equal to or higher than the lower limit value 22404 of the correction adjustment, and equal to or lower than the upper limit value 22405 of the correction adjustment, a composite function 22408 formed by combining the extension function 22403 and the function 22406 at gradient of 1 is applied. When applying the contrast correction function 22409, the frequency distribution 22402 of the output image brightness as shown by the graph 2203 of FIG. 22A is formed as the distribution having the distribution at dark side largely extended. Accordingly, visibility of the very dark region 22407 may be improved.

Figure 29A:
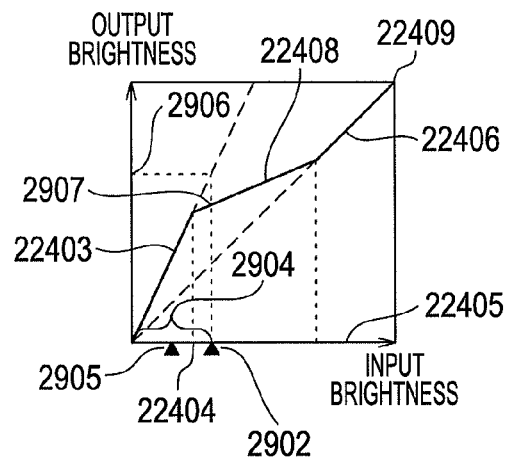
FIG. 29A is a graph indicating a contrast correction function to which enlargement function is applied according to an embodiment of the present invention.
Figure 29B:
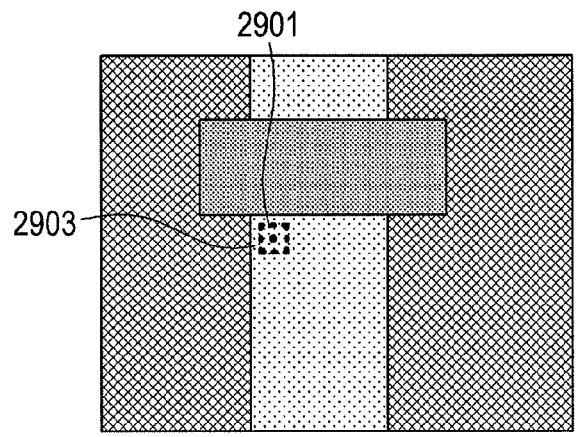
FIG. 29B illustrates an image of the inspection object subjected to the contrast correction according to an embodiment of the present invention.

When applying the contrast correction function 22409, the brightness value of the subject pixel by itself may be employed as the brightness value of the input image, which is compared with the lower limit value 22404 and the upper limit value 22405 of the correction adjustment. Statistic such as average value, weighted average value, and median value is obtained from the brightness value of the group of pixels around the subject pixel so as to be compared. For example, if a pixel 2901 shown in FIG. 29B is employed, its brightness has the value of 2902 as shown in FIG. 29A, which is larger than the lower limit value 22404 of the correction adjustment. Referring to the graph of FIG. 29A, the output brightness obtained when applying the extension function 22408 as the contrast correction function 22409 corresponding to the brightness value 2902 takes a value as 2907.

If the brightness value of the pixel group 2093 around the subject pixel 2901 shown in FIG. 29B takes the value of 2904 as indicated by FIG. 29A, and it is mostly distributed under the lower limit value 22404 of the correction adjustment, the extension function 22403 is applied to the adjacent pixel group 2903 as the contrast correction function because the average value 2905 is below the lower limit value 222404 of the average value 2905. Likewise the adjacent pixel group 2903, the extension function 22403 is applied to the brightness value 2902 of the subject pixel 2901 as the contrast correction function so as to take the output brightness 2906 larger than the output brightness 2907 obtained when applying the extension function 22408. This makes it possible to reflect the pixel brighter than the adjacent area around the dark range, that is, possible defect portion in the output image without damaging the brightness difference.

Figure 29C:
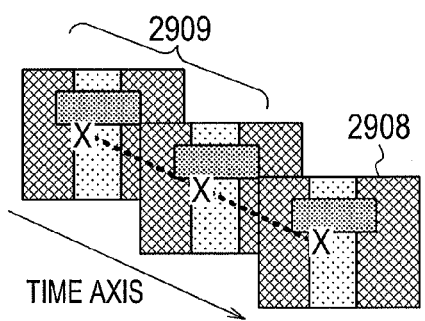
FIG. 29C illustrates an example of the method for obtaining statistic according to an embodiment of the present invention.

Feature amounts of the respective pixels are derived from the brightness value of the input image, and segmentation is performed under the condition that the pixels each having similar feature amount are regarded as the same region for obtaining the statistic from the brightness value in the same region. As the camera picks up video images, images of a plurality of past frames 2909 each having close with one another in terms of time besides the latest frame 2908 are used to obtain the statistic as shown in FIG. 29C. This makes it possible to calculate the statistic in a stabilized manner.

Figure 22B:
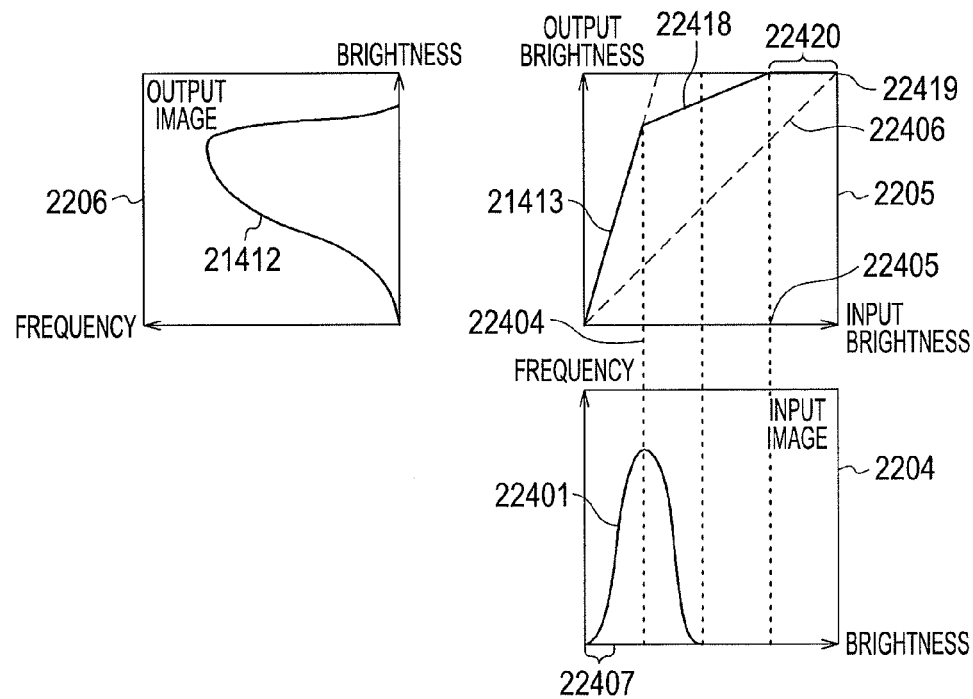
FIG. 22B shows a graph indicating the frequency distribution of brightness of the input image as an example of the contrast correction while enlarging the distribution at the dark side set as the interest region, a graph indicating the correction function, and a graph indicating the frequency distribution of brightness of the output image.

When emphasizing the very dark range 22407, gradient of the extension function 22413 needs to be increased as indicated by the graph 2205 of FIG. 22B.

Referring to the graph 2205 of FIG. 22B, assuming that the gradient of the composite function 22418 is kept unchanged in the section where the value is equal to or higher than the lower limit value 22404 of the correction adjustment, and is equal to or lower than the upper limit value 22405 of the correction adjustment, the frequency distribution 22412 of the brightness of the output image has its dark side distribution largely extended as indicated by the graph 2206 of FIG. 22B. As the graph 2205 of FIG. 22B shows, the gradient of the correction function 22419 in the significantly bright range 22420 of the brightness distribution becomes substantially zero. If the gradient becomes substantially zero, the visual feature of the human tends to be less sensitive. When applying the correction function 22419 to the significantly bright range 22420, visibility in the region is deteriorated.

The gradient of the extension function 22413 may be adjusted using the adjustment gauge 1920 for inputting the level of the contrast correction process displayed on the GUI 2004.

Figure 23A:
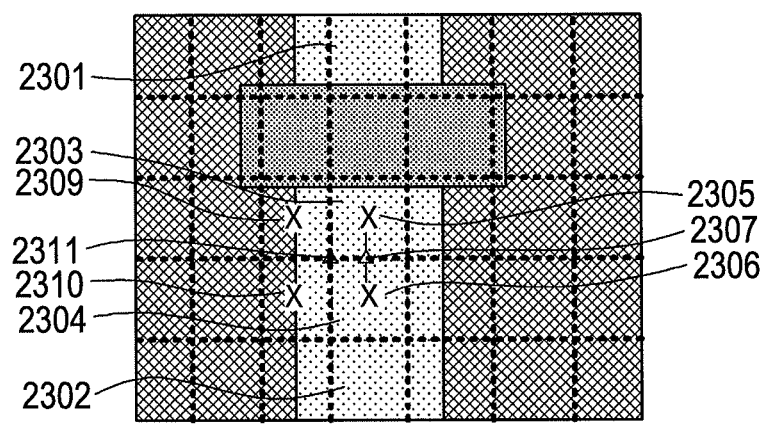
FIG. 23A represents an image of an inspection object split into a plurality of regions according to an embodiment of the present invention.

Meanwhile, the input image is split into a plurality of regions as shown in FIG. 23A, and frequency distribution of brightness is obtained for each split region so as to apply different correction function to each split region. For example, a correction function 22409 shown in the graph 2202 of FIG. 22A is applied to a split region 2301 having the dark regions and bright regions mixed. It is preferable to apply the correction function 22419 shown by the graph 2205 of FIG. 22B to the split region 2302 which exhibits only dark regions. In the case of the split region 2301 having the dark region and the bright region coexisted, visibility of the dark region may be improved without deteriorating the visibility of the bright region. In the case of the split region 2302 only with dark region, its visibility may further be improved. The split regions may form a grid-like shape, and set the grid size with the GUI.

When the split region 2303 having the dark and bright regions coexisted and the split region 2304 having only the dark region are provided adjacent with each other, correction functions for the respective regions are different. If those functions are applied, there may be lack of continuity in brightness at the boundary between those regions, which may mislead the visual inspection.

Figure 23B:
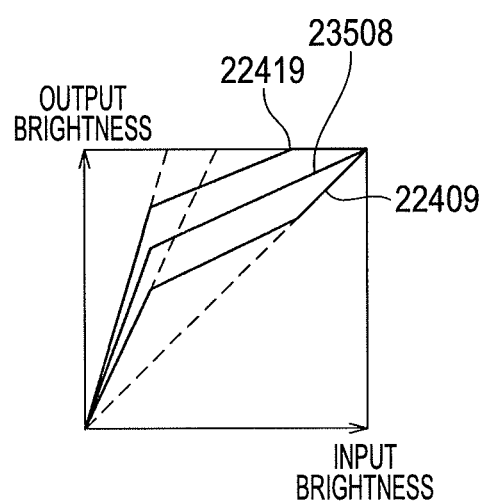
FIG. 23B is a graph indicating an example of the correction function which varies for each of the plurality of split regions according to the embodiment of the present invention.

For this, the function obtained by combining the correction functions 22409 and 22419 in accordance with the distance from the central coordinate 2305 of the former region, and the distance from the central coordinate 2306 of the latter region may be applied. For example, it is preferable to apply the composite function 2308 as a median between the correction functions 22409 and 22419 as indicated by the graph of FIG. 23B to the intermediate coordinate 2307 between the center coordinates 2305 and 2306. Likewise, it is preferable to apply the correction function obtained by combining four correction functions corresponding to the center coordinates 2305, 2306, 2309 and 2310 to the internal coordinates of those center coordinates 2305, 2306, 2309 and 2310. This makes it possible to execute the contrast correction without making brightness at the boundary between split regions intermittent.

Figure 27A:
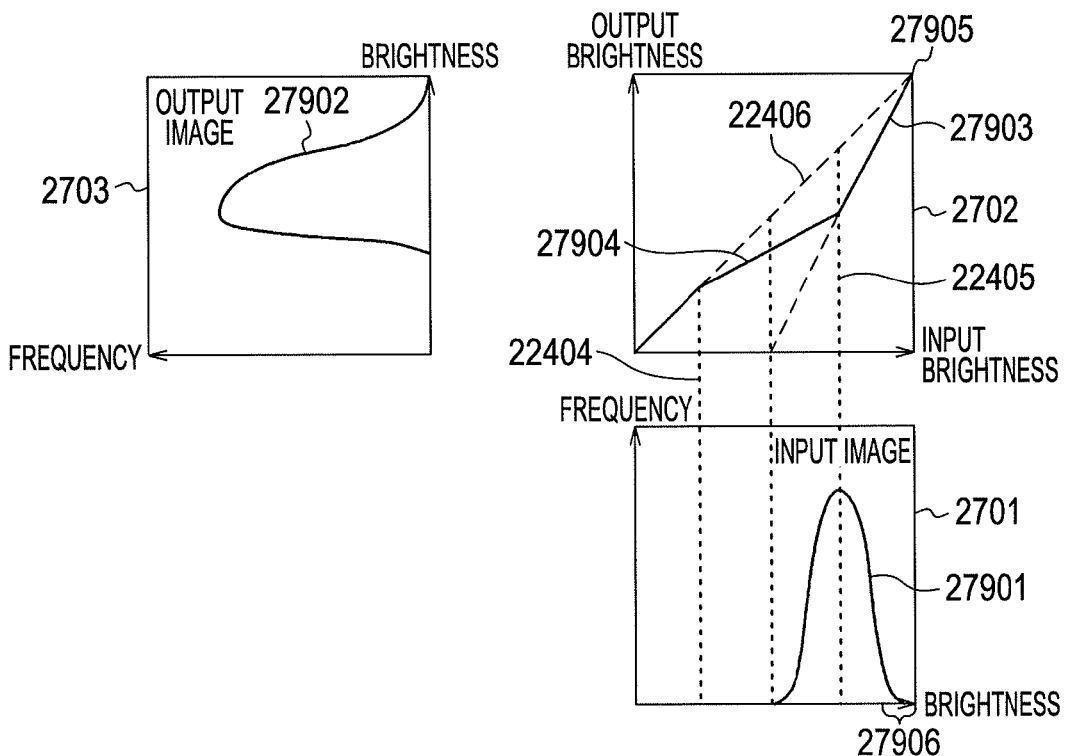
FIG. 27A shows an example of contrast correction for setting a bright region to the interest region according to an embodiment of the present invention, with the graph indicating the frequency distribution of brightness of the input image, the graph indicating the correction function, and the graph indicating the frequency distribution of brightness of the output image.
Figure 27B:
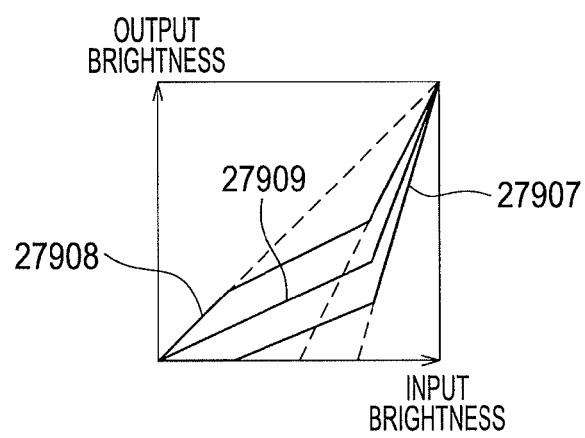
FIG. 27B is a graph indicating an example of the correction function according to an embodiment of the present invention.

FIGS. 27A and 27B represent an example of the contrast correction for automatically setting the bright region to the interest region. Likewise the description referring to FIGS. 22A and 22B, in the example, the extension function 27903 is directly applied to the input image with the frequency distribution 27901 of brightness as shown in the graph 2701 of FIG. 27A if the value is equal to or larger than the upper limit value 22405 of the correction adjustment. If the input brightness is equal to or smaller than the lower limit value 22404 of correction adjustment, the function 22406 at gradient of 1, which does not correct the contrast, is applied. If the input brightness is equal to or higher than the lower limit value 22404 of correction adjustment, and equal to or lower than the upper limit value 22405 of correction adjustment, the composite function 27904 obtained by combining the extension function 27903 and the function 22406 at gradient of 1 is applied. When applying the contrast correction function 27905 to the input image with the brightness frequency distribution 27901 of the graph 2701, the brightness frequency distribution 27902 of the output image has the dark distribution further extended as indicated by the graph 2703. This makes it possible to improve visibility of the significantly bright region 27906 of the brightness frequency distribution 27901 of the input image as indicated by the graph 2701.

The input image is further split into a plurality of regions as shown in FIG. 23A, and the correction functions which are different by the respective split regions may be applied. This makes it possible to improve visibility of the bright region of the split region 2301 having both the dark regions and bright regions coexisted without deteriorating visibility of the dark region. In the case of the split region 2302 only having the bright regions, visibility of the bright region may further be improved.

Likewise the explanation referring to FIG. 23B, a function 2709 obtained by combining correction functions A2707 and B2708 corresponding to the respective split regions may be applied in accordance with the distance from each center coordinate in a plurality of adjacent split regions as indicated by the graph shown in FIG. 27B. This makes it possible to execute the contrast correction without making the brightness intermittent at the boundary between the split regions.

Figure 24A:
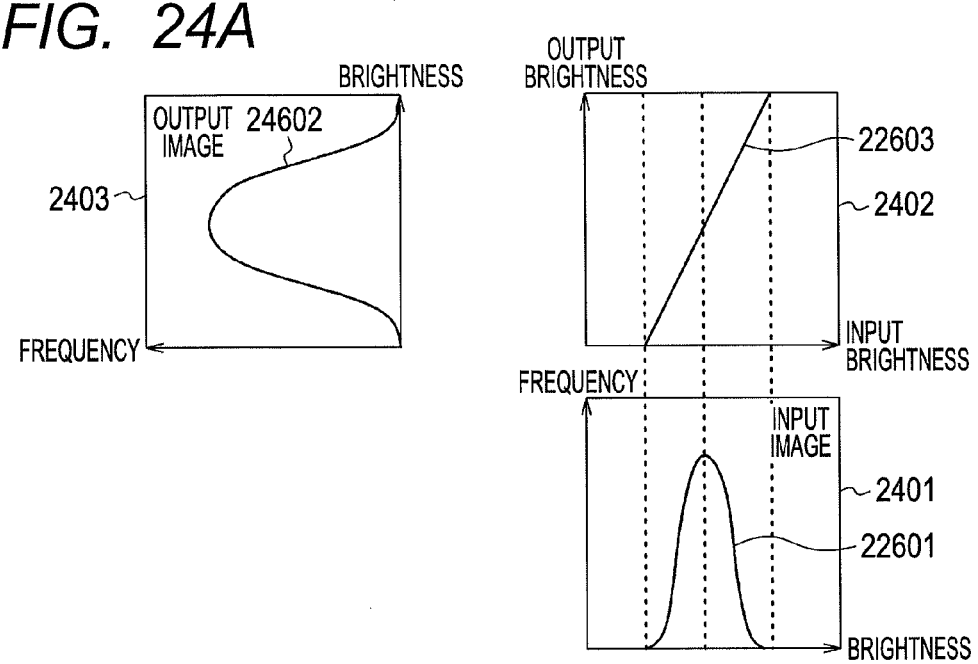
FIG. 24A shows a graph indicating a frequency distribution of brightness of an input image as an example of correcting contrast of the image where the frequency distribution of brightness of the input image is concentrated at the center, a graph indicating the correction function, and a graph indicating the frequency distribution of brightness of the output image.
Figure 24B:
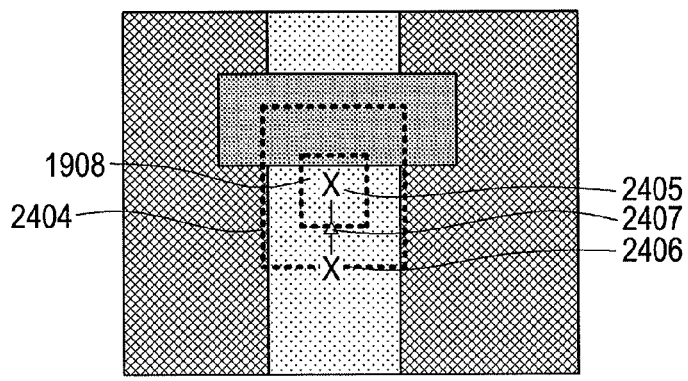
FIG. 24B represents an image of the inspection object in the state where the portion around the center is automatically set to the interest region according to the embodiment of the present invention.
Figure 24C:
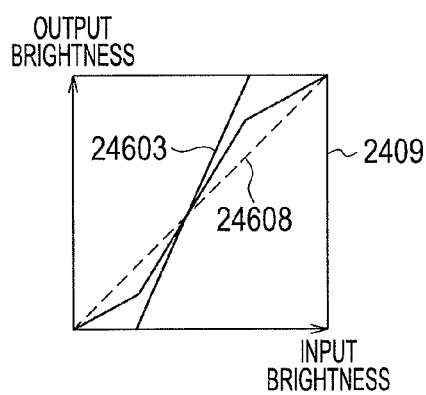
FIG. 24C is a graph indicating an example of the correction function for correcting contrast of the image in the state where the frequency distribution of brightness of the input image is concentrated on the center according to the embodiment of the present invention.

FIGS. 24A to 24C represent an example of contrast correction for automatically setting the portion around the center of the image to the interest region. In this example, the brightness frequency distribution 24601 as indicated by the graph 2401 of FIG. 24A in the region 1908 around the center of the image as shown in FIG. 24B is checked. If the distribution is partially biased in the range from the minimum to the maximum values, the contrast correction function 24603 as shown in the graph 2402 is used to linearly extend the distribution in the range from the minimum to the maximum values. When applying the contrast correction function 24603, the brightness frequency distribution of the image as indicated by the graph 2403 is extended in the range from the minimum to the maximum values. This makes it possible to improve visibility of the region 1908 around the center of the image.

When the contrast correction function 24603 is applied only to the region 1908 around the center of the image as shown in FIG. 24B, the brightness at the boundary between circumferences is made intermittent, thus misleading the visual inspection. Meanwhile, a region 2404 larger than the region 1908 around the center is set outside so that the function obtained by combining the correction function 2403 and the function at gradient of 1 is applied in accordance with the distances from the center coordinate 2405 of the region 1908 around the center and from the outer circumferential coordinate 2406 of the larger region 2404 as FIG. 24B shows. For example, it is preferable to apply the intermediate composite function 2409 as a median between the correction functions 2403 and 2408 to the intermediate coordinate 2407 between the center coordinate 2405 and the outer circumference coordinate 2406. This makes it possible to execute the contrast correction without making brightness at the boundary between circumferences intermittent.

Figure 25A:
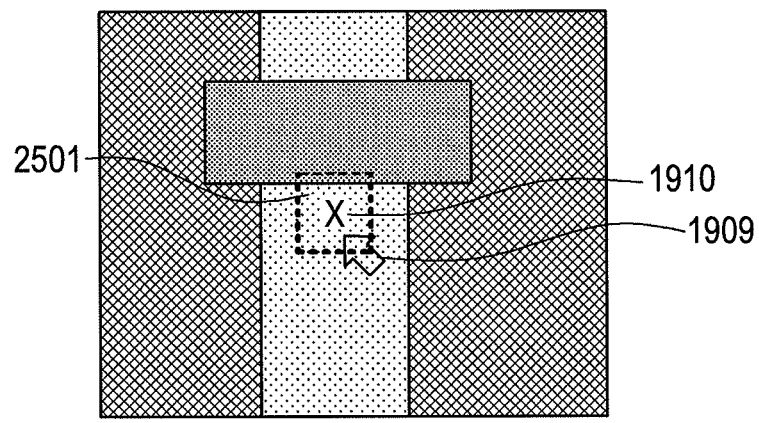
FIG. 25A illustrates an image of the inspection object as an example where the interest region is designated on GUI according to an embodiment of the present invention.
Figure 25B:
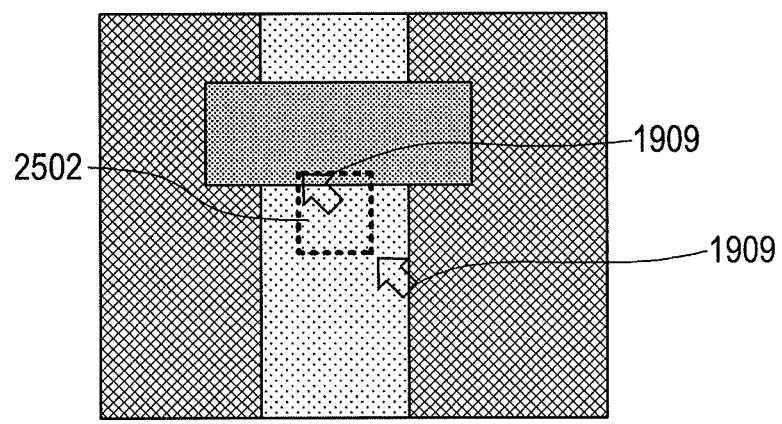
FIG. 25B illustrates an image of the inspection object as an example where the interest region is set by designating a corner on GUI according to the embodiment of the preset invention.

FIGS. 25A and 25B represent an example of the contrast correction having the interest region designated by the user on the GUI. In this example, the user designates an arbitrary point 1910 as the interest region using the mouse cursor 1909 on the GUI as shown in FIG. 25A. Likewise the explanation referring to FIGS. 24A to 24C, the brightness frequency distribution is examined with respect to the region 2501 in the range having the arbitrary point 1910 as the center. Then if the distribution is partially biases in the range from the minimum to maximum values, the correction function for linearly extending the distribution in the range from the minimum to the maximum values is applied. This makes it possible to improve visibility of the region 2501 in the certain range having the arbitrary point 1910 centered. Likewise the explanation referring to FIGS. 24A to 24C, the brightness is made intermittent at the boundary between circumferences, and accordingly, the composite function obtained by combining the correction functions may be applied. This makes it possible to execute the contrast correction without making the brightness at the boundary between circumferences intermittent, thus realizing the contrast correction.

The user is allowed to designate the corner on the GUI using the mouse cursor 1909 so as to designate the arbitrary rectangular region 2502 as the interest region.

Figure 31:
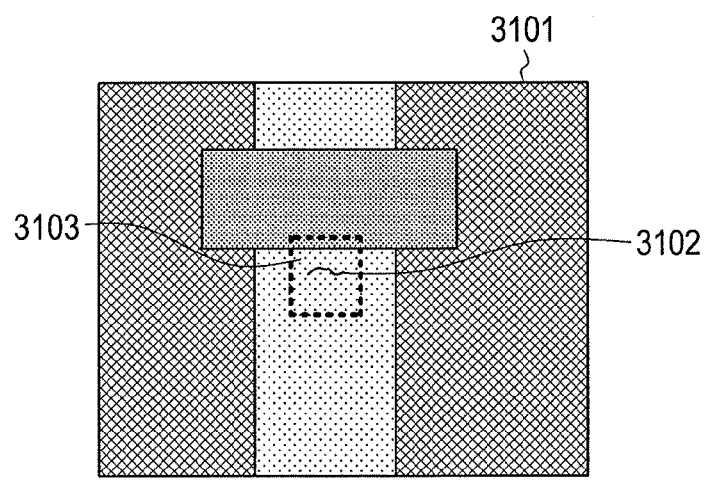
FIG. 31 illustrates an image of the inspection object by setting a portion around a possible defect to the interest region according to an embodiment of the present invention.

FIG. 31 represents an exemplary contrast correction for automatically setting the portion around the possible defect as the interest region. Inspection with respect to the inspection object which it greatly influenced by radiation and bears a large pressure, for example, nuclear reactor is generally executed with respect to minute defect of the structure, especially the defect of stress corrosion cracking (SCC). In this example, the portion of the input image 3101 having brightness and color different from those of circumference is identified by the image processing, and the identified portion is set as the possible defect 3102. The portion around the possible defect may be automatically set to the interest region 3103. Likewise the description referring to FIGS. 24A to 24C, the brightness frequency distribution with respect to the interest region 3103 is examined. If the distribution is partially biased in the range from the minimum to maximum values, the distribution is linearly extended in the range from the minimum to the maximum values. When applying the contrast correction function, the brightness frequency distribution of the output image is extended in the range from the minimum to the maximum values.

This makes it possible to improve visibility of the interest region 3102. Furthermore, likewise the description referring to FIGS. 24A to 24C, brightness at the boundary between circumferences is made intermittent, the composite function obtained by combining correction functions may be applied. This makes it possible to execute the contrast correction without making brightness at the boundary between circumferences intermittent.

Figure 28A:
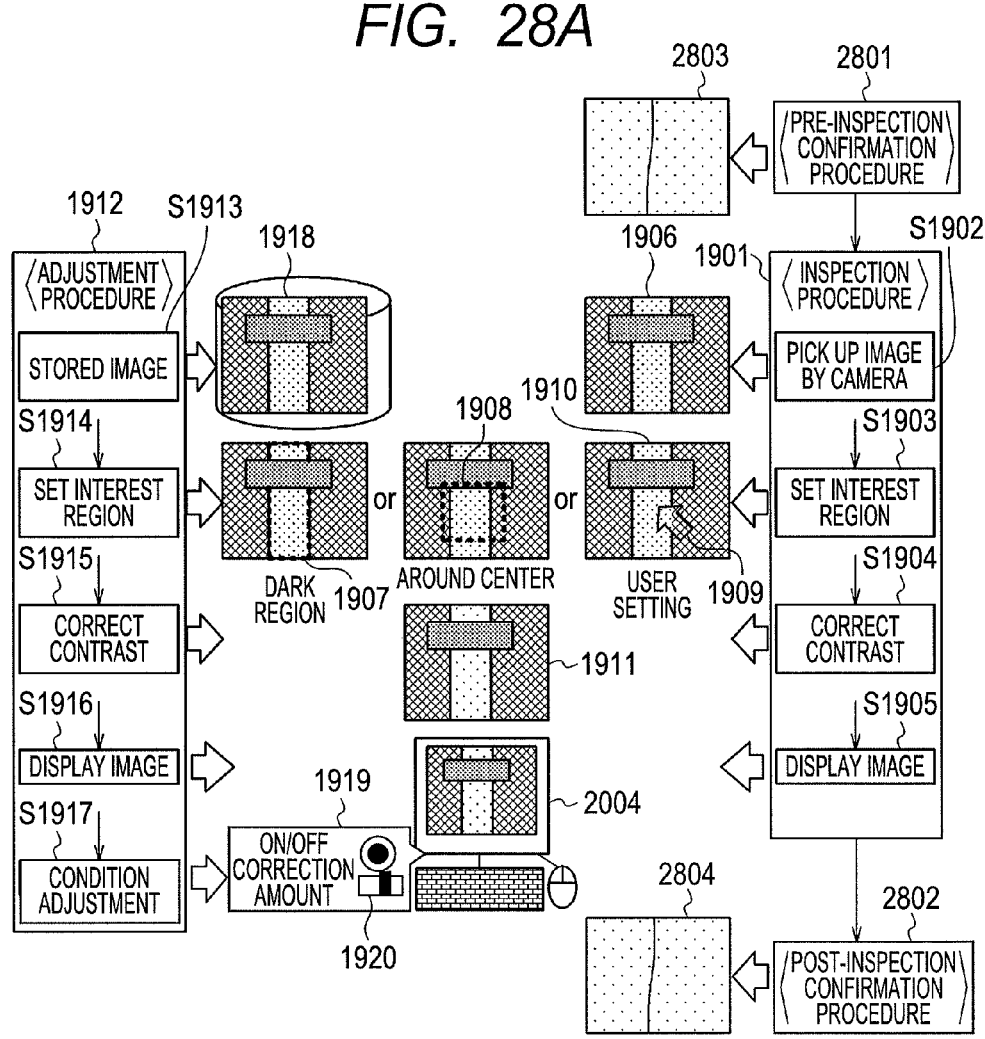
FIG. 28A represents a flow of another exemplary sequence for inspection according to an embodiment of the present invention.

FIG. 28A represents another sequence for visual inspection. This sequence for visual inspection is formed by adding a pre-inspection confirmation procedure 2801 and a post-inspection confirmation procedure 2802 to the head and end of the inspection procedure 1901 for actual inspection, respectively. Likewise the example shown in FIG. 19, the adjustment procedure 1912 for adjustment before inspection may be contained. The inspection procedure 1901 and the adjustment procedure 1912 for adjustment before inspection are the same as those described referring to FIG. 19, and explanations thereof, thus will be omitted.

The pre-inspection confirmation procedure 2801 and the post-inspection confirmation procedure 2802 are performed for confirming visibility of the camera image in consideration of possible damage to the camera. Reliability of the inspection may be ensured by confirming that there is no problem in the visibility before and after the inspection.

Figure 28B:
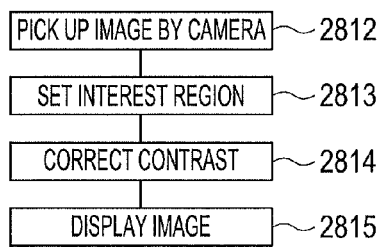
FIG. 28B represents a flow of an exemplary sequence for pre-inspection confirmation procedure according to an embodiment of the present invention.
Figure 28C:
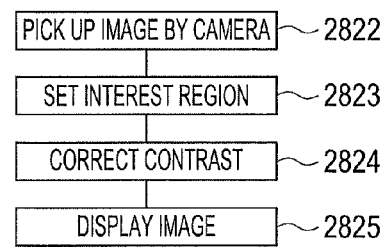
FIG. 28C represents a flow of an exemplary sequence for post-inspection confirmation procedure according to the embodiment of the present invention.

Likewise the inspection procedure 1901, the pre-inspection confirmation procedure 2801 includes procedures shown in FIG. 28B, that is, camera pick-up step S2812, interest region setting step S2813, contrast correction step S2814, and screen display step S2815. As the camera picks up the video images, in principle, the aforementioned steps will be repeatedly executed for each frame.

In the camera pick-up step S2812, an image 2803 is obtained as a picked up image of a pseudo inspection object which models an inspection object 2005. If the user visually confirms the pseudo inspection object in screen display step S2815, the process proceeds to the inspection procedure S1901. If the user cannot visually confirm, the process executes the adjustment procedure 1912 as described above. When execution of the adjustment procedure 1912 is finished, the process proceeds to the inspection procedure 1901.

Likewise the pre-inspection confirmation procedure 2801, the post-inspection confirmation procedure 2802 includes camera pick-up step S2822, interest region setting step S2823, contrast correction step S2824, and screen display S2825. As the camera picks up the video images, in principle, the aforementioned steps will be repeatedly executed for each frame.

Likewise the pre-inspection confirmation procedure 2801, in the camera image pick-up step S2822, a thin wire is generally used as the pseudo inspection object, and a picked up image 2804 of the pseudo inspection object is obtained. In the screen display step S2825, if the user is capable of visually confirming the pseudo inspection object, reliability of inspection is ensured.

In contrast correction step S2824, the pre-inspection confirmation procedure 2801, the inspection procedure 1901, and the post-inspection confirmation procedure 2802 are executed without changing the state preliminarily adjusted in the adjustment procedure 1912. This ensures reliability of the inspection so long as the camera is not damaged.

Figure 26A:
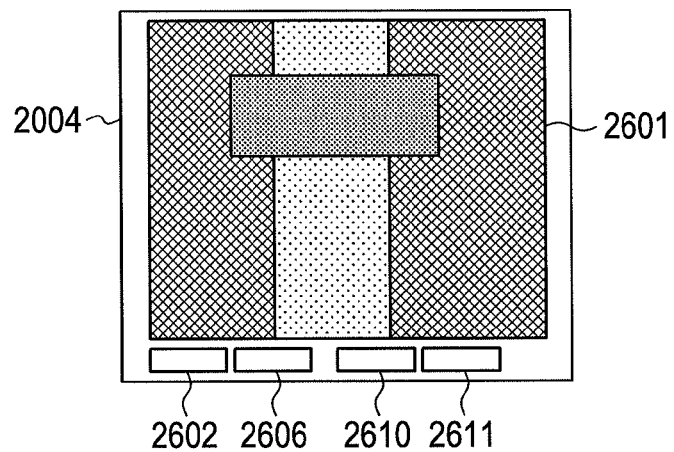
FIG. 26A is a front view of a displayed screen of a single image as an example of GUI for visual inspection according to an embodiment of the present invention.
Figure 26B:
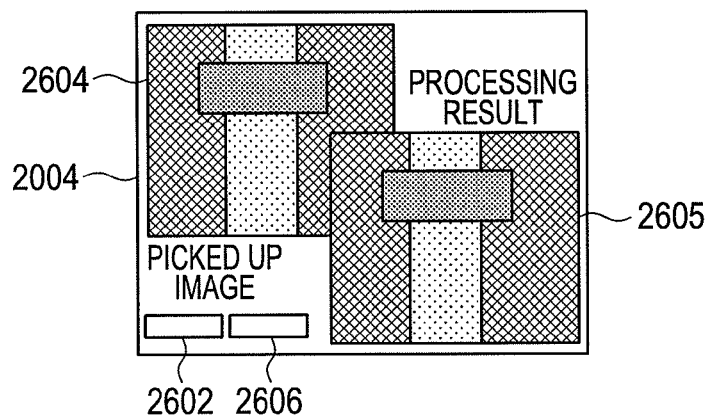
FIG. 26B is a front view of a displayed screen of two images as an example of GUI for visual inspection according to an embodiment of the present invention.
Figure 26C:
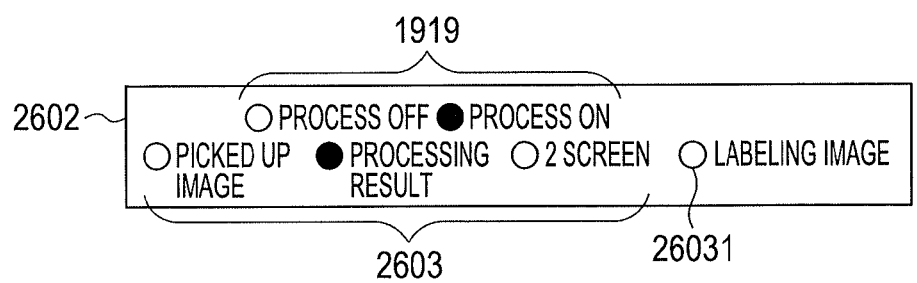
FIG. 26C represents an example of a dialogue indicating ON/OFF of the process displayed on GUI according to an embodiment of the present invention.

FIGS. 26A to 26E represent an exemplary GUI for executing visual inspection. Referring to FIG. 26A, in the inspection procedure 1901, a camera image 2601 is generally displayed on a GUI 2004. A dialogue A2602 may be displayed on the GUI 2004. The dialogue A2602 may have buttons 1919 for ON/OFF switching of the process as shown in FIG. 26C. Buttons 2603 for switching display image may be shown on the dialogue A2602. When selecting the switching button 2603 to picked up image, the camera image 2601 on the GUI 2004 is switched to the picked up image. When selecting the switching button 2603 to processing result, the camera image 2601 is switched to the processing result image. When selecting the switching button 2603 to dual display, the picked up image 2604 and the processing result image 2605 are displayed on the GUI 2004 simultaneously as shown in FIG. 26B. Furthermore, a button 26031 is displayed on the dialogue A2602 for storing the camera image 2601 confirmed on the GUI 2004, and the processing result image while being labeled. In the state where at least one of the camera image 2601 and the processing result image is displayed on the GUI 2004, when the button 26031 is clicked, the image displayed on the GUI 2004 is appropriately labeled (for example, image pick-up date, code for image pick-up place) so as to be stored in the storage means 2003.

Figure 26D:
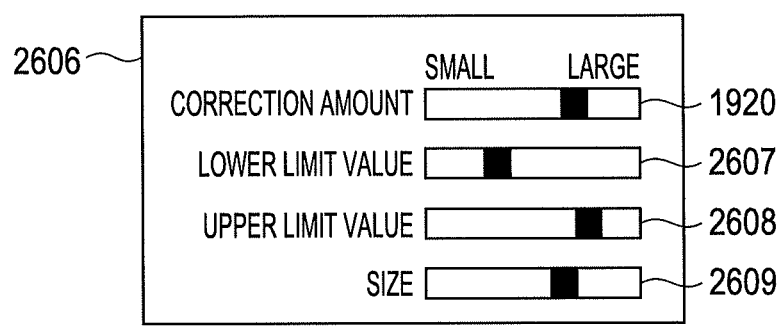
FIG. 26D represents an example of the dialogue indicating adjustment gauges of correction amount displayed on GUI according to an embodiment of the present invention.

The adjustment procedure 1912 allows the dialogue B2606 to be displayed on the GUI 2004. The adjustment gauge 1920 indicating the correction level as shown in FIG. 26D may be displayed on the dialogue B2606. The adjustment gauge 1920 is used for inputting the level of the contrast correction process in the aforementioned condition adjustment step S1917. An adjustment gauge 807 of the lower limit value of the correction adjustment and an adjustment gauge 808 of the upper limit value of the correction adjustment may be displayed on the dialogue B2606. The both gauges are used for adjusting the lower limit value 404 and the upper limit value 405 of the correction adjustment as described referring to FIGS. 22A and 22B. This makes it possible to appropriately adjusting the range of brightness for improving visibility. An adjustment gauge 809 of size corresponding to the split region may be displayed on the dialogue B806. The adjustment gauge 809 for size is used for setting the size of the split region as described in FIG. 23A.

Figure 26E:
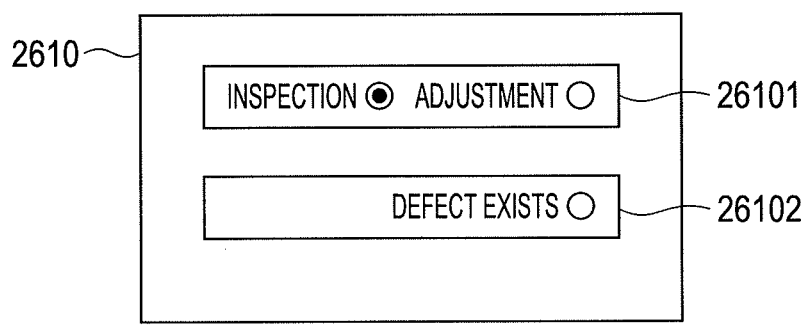
FIG. 26E represents an example of a dialogue indicating buttons for selecting inspection/adjustment displayed on GUI according to an embodiment of the present invention.

A dialogue C2610 is displayed on the GUI 2004 as shown in FIG. 26E so as to select either inspection or adjustment corresponding to the inspection procedure 1901 or the adjustment procedure 1912 in an inspection/adjustment selection region 26101. If disadvantage exists in the picked up image or the processing result displayed on the GUI 2004, a display 26102 on the dialogue C2610 is displayed to show that the disadvantage exists in the dialogue C2610. Further, the GUI 2004 indicates a dialogue 2611 that indicates image pick-up place and image pick-up date.

Figure 30A:
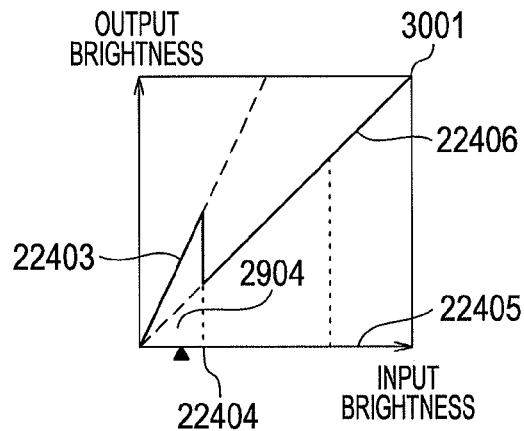
FIG. 30A is a graph indicating an exemplary contrast correction function applied to the contrast correction for automatically setting the dark region to the interest region according to an embodiment of the present invention.
Figure 30B:
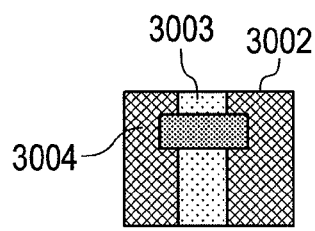
FIG. 30B illustrates an output image having the brightness partially inverted as a result of contrast correction by setting the dark region to the interest region according to an embodiment of the present invention.

Another example of the contrast correction for automatically setting the dark region to the interest region will be described. The output brightness of the contrast correction function 22409 as described referring to FIG. 22A has continuity. However, the contrast correction function having the output brightness with no continuity may be used for providing the image processing condition optimized to the interest region. For example, an extension function 22403 may be directly applied in the region having the input brightness equal to or lower than the lower limit value 22404 of the correction adjustment as indicated by FIG. 30A. If the input brightness is equal to or higher than the lower limit value 22404 of the correction adjustment, the function 406 at gradient 1, which does not correct the contrast, is applied. When the contrast correction function 1201 is applied, the output brightness becomes intermittent at the point where the input brightness coincides with the lower limit value 22404 of the correction adjustment. As the output image 1202 of FIG. 30B shows, the very dark region 1203 is brought to be brighter than the peripheral region 1204, resulting in the image having brightness partially inverted. Meanwhile, the distribution of the dark side is further extended irrespective of the size of the brightness distribution in the split region, thus improving visibility of the very dark range 22407 shown in FIG. 22A or 22B.

Figure 30C:
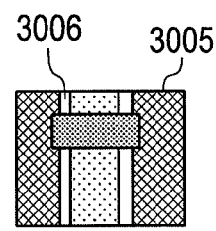
FIG. 30C illustrates the output image having a circumferential region partially saturated as a result of contrast correction by setting the dark region to the interest region according to the embodiment of the present invention.

Another example of the contrast for automatically setting the dark region to the interest region will be shown. The correction function 22409 is applied to the split region 2301 having the dark and bright regions coexisted for executing the contrast correction without deteriorating visibility of the bright region as described referring to FIGS. 23A and 23B. The correction function 22419 may be applied to the split region 2301 for optimizing the image processing condition to the interest region. This may deteriorate visibility of the bright region. For example, referring to the output image 1205 shown in FIG. 30C, brightness of a part 1206 of the circumferential region 1204 is saturated. Meanwhile, distribution of the dark side is further extended irrespective of the size of the brightness distribution in the split region, thus improving visibility of the very dark region 22407 shown in FIG. 22A or 22B.

When automatically setting the bright region as the interest region, automatically setting the portion around the center of the image to the interest region, the user designates the interest region, and automatically setting the portion around the possible defect to the interest region, the contrast correction may be applied for forming the image processing condition optimized to the interest region as described above.

Above-described examples have been explained for representing an embodiment of the present invention which is not limited to those described above. The present invention includes the case having a part of the described structure replaced with structure having the equivalent function, or the case having a part of impractical function omitted.

The invention may be embodied in other specific forms without departing from the spirit or essential characteristics thereof. The present embodiments are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. An inspection apparatus comprising:
    an image pick-up unit provided with an optical video camera;
    an image obtaining unit which fetches a video image that contains a signal (noise) that is substantially independent of each frame of the video image obtained by picking up a video image of an inspection object by the image pick-up unit;
    a local alignment unit which locally aligns a plurality of frames of the video image with different time phases;
    a frame synthesizing unit which synthesizes the plurality of frames of the video image aligned by the local alignment unit for generating an image formed of the synthesized frames with an SN ratio higher than the SN ratio of each of the frames before frame synthesis; and
    an image output unit for displaying or recording an image formed of the synthesis frame generated by the frame synthesizing unit,
    wherein the image output unit displays simultaneously the image fetched from the optical video camera and the image formed of the synthesized frames generated by the frame synthesizing unit.

2. The inspection apparatus according to claim 1, wherein the signal (noise) that is substantially independent of each frame contained in the video image picked up by the optical video camera is a radiation noise.

3. The inspection apparatus according to claim 1,
    wherein the optical video camera of the image pick-up unit is a color optical video camera;
    wherein the image obtaining unit fetches the video image from the color optical video camera; and
    wherein the frame synthesizing unit calculates a value of each component detected by a plurality of light receiving elements for detecting different color components of the color optical video camera with respect to the color video image fetched by the image obtaining unit, and further calculates a denoising level for each of the calculated component values.

4. The inspection apparatus according to claim 1, further comprising:
    a noise amount measurement unit which measures an amount of the signal (noise) substantially independent of the respective frames of the video image fetched from the optical video camera of the image pick-up unit in the image obtaining unit; and
    a processing parameter change unit which changes a processing parameter for processing the frame of the video image or the synthesized frames in the local alignment unit, the frame synthesizing unit or the image output unit in accordance with the amount of the signal as noise substantially independent of the respective frames of the video image, which is measured by the noise amount measurement unit.

5. The inspection apparatus according to claim 4, wherein the noise amount measurement unit measures the amount of the signal as noise which is substantially independent of the respective frames using the frames of the video image before and after synthesizing.

6. The inspection apparatus according to claim 4, wherein the processing parameter change unit changes one of an image display rate and a recording rate for processing the frame of the video image or the synthesis frame in the local alignment unit, the frame synthesizing unit, or the image output unit.

7. The inspection apparatus according to claim 4, further comprising a calibration unit,
    wherein the calibration unit adjusts the processing parameter for the frame synthesizing unit to generate the image with a high SN ratio, or the processing parameter for the image output unit to display or record the image using the image for calibration; and
    wherein the calibration unit includes an interface for generating a deteriorated image formed through pseudo superimposing of the noise on the image for calibration, subjecting the generated deteriorated image to a denoising process, and adjusts the processing parameter for the frame synthesizing unit to generate the image with the high SN ratio, or processing parameter for the image output unit to display or record the image, using the denoised image.

8. The inspection apparatus according to claim 4, wherein the calibration unit adjusts the processing parameter so that the image obtained by subjecting the deteriorated image to the denoising process is brought to be close to the image for calibration.

* * * * *